(12) United States Patent
Aramoto et al.

(10) Patent No.: US 9,338,728 B2
(45) Date of Patent: May 10, 2016

(54) UE, ANDSF, MOBILE COMMUNICATION SYSTEM, PGW, AND COMMUNICATION METHOD

(71) Applicant: Sharp Kabushiki Kaisha, Osaka-shi, Osaka (JP)

(72) Inventors: Masafumi Aramoto, Osaka (JP); Masayuki Enomoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 39 days.

(21) Appl. No.: 14/347,669

(22) PCT Filed: Sep. 26, 2012

(86) PCT No.: PCT/JP2012/074759
§ 371 (c)(1),
(2) Date: Mar. 27, 2014

(87) PCT Pub. No.: WO2013/047608
PCT Pub. Date: Apr. 4, 2013

(65) Prior Publication Data
US 2014/0233465 A1 Aug. 21, 2014

(30) Foreign Application Priority Data
Sep. 28, 2011 (JP) ................. 2011-211854

(51) Int. Cl.
*H04W 4/00* (2009.01)
*H04W 48/04* (2009.01)
*H04W 48/18* (2009.01)
*H04W 48/14* (2009.01)
*H04W 40/02* (2009.01)
*H04W 48/16* (2009.01)

(52) U.S. Cl.
CPC ............. *H04W 48/04* (2013.01); *H04W 40/02* (2013.01); *H04W 48/14* (2013.01); *H04W 48/16* (2013.01); *H04W 48/18* (2013.01)

(58) Field of Classification Search
None
See application file for complete search history.

(56) References Cited

U.S. PATENT DOCUMENTS

2009/0196265 A1 8/2009 Mariblanca Nieves et al.
2010/0323698 A1 12/2010 Rune et al.
(Continued)

FOREIGN PATENT DOCUMENTS

JP 2008-544596 A 12/2008
WO 2010/147527 A1 12/2010

OTHER PUBLICATIONS

English translation of Official Communication issued in corresponding International Application PCT/JP2012/074759, mailed on Apr. 10, 2014.
(Continued)

*Primary Examiner* — Ming-Trang Nguyen
(74) *Attorney, Agent, or Firm* — Keating & Bennett, LLP

(57) ABSTRACT

UE receives a mobile operator policy including flow identification information, access system identification information, and a degree of compulsion from an ANDSF, and in a case where the degree of compulsion included in the mobile operator policy is a degree of compulsion that compels the UE to perform switching, transmits a request to forcibly switch a communication path used flow communication corresponding to the flow identification information to an access system corresponding to the access system identification information included in the mobile operator policy. As a result, by transmitting an MO policy from the ANDSF to the UE while the UE connected to a first access system is performing data communication, the UE changes a UE policy to the MO policy, thereby providing a mobile communication system or the like that is capable of avoiding concentration of traffic in the first access system.

3 Claims, 24 Drawing Sheets

(56) References Cited

U.S. PATENT DOCUMENTS

2013/0021968 A1* 1/2013 Reznik et al. .......... 370/328
2013/0089076 A1* 4/2013 Olvera-Hernandez
 et al. ...................... 370/332

OTHER PUBLICATIONS

Official Communication issued in International Patent Application No. PCT/JP2012/074759, mailed on Dec. 25, 2012.
"3rd Generation Partnership Project; Technical Specification Group Services and System Aspects; IP Flow Mobility; and Seamless Wireless Local Area Network (WLAN) Offload; Stage 2, (Release 10)," 3GPP TS 23.261 V10.1.0, Sep. 2010, pp. 1-22.
"3rd Generation Partnership Project; Technical Specification Group Services and System Aspects; Architecture Enhancements for Non-3GPP Accesses (Release 10)," 3GPP TS 23.402 V10.5.0, Sep. 2011, 27 pages.
"3rd Generation Partnership Project; Technical Specification Group Services and System Aspects; Multi Access PDN Connectivity and IP Flow Mobility, (Release 9)," 3GPP TR 23.861 V1.3.0, Sep. 2009, pp. 1-49.
"IP Flow Mobility Policies," Motorola, 3GPP TSG SA WG2 Meeting #77, Jan. 18-22, 2010, pp. 1-4.

* cited by examiner

| FLOW IDENTIFIER | ACCESS SYSTEM |
|---|---|
| FLOW 1 | LTE |
| FLOW 2 | LTE |
| FLOW 3 | WLAN |

(b)

| FLOW IDENTIFIER | ACCESS SYSTEM |
|---|---|
| FLOW 1 | LTE |
| FLOW 2 | WLAN |
| FLOW 3 | WLAN |

| FLOW IDENTIFIER | DEGREE OF COMPULSION | ACCESS SYSTEM |
|---|---|---|
| FLOW 1 | SHALL | LTE |
| FLOW 2 | SHALL | WLAN |
| FLOW 3 | SHALL | WLAN |

FIG. 6
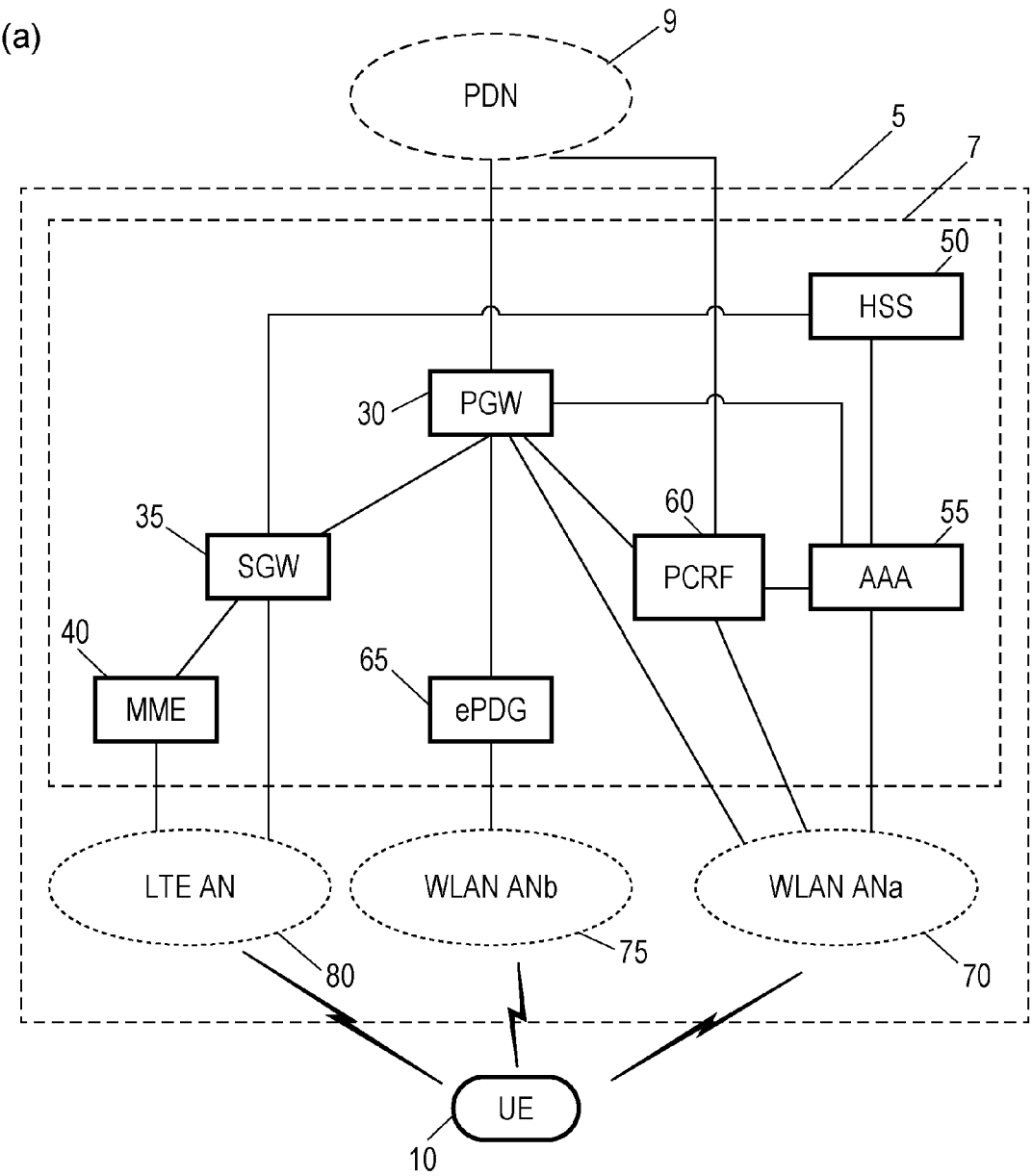
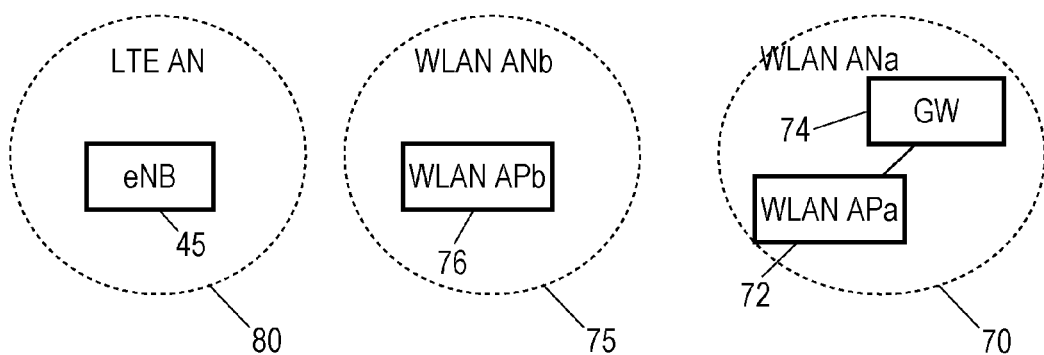

FIG. 8

| ACCESS SYSTEM 1 | ACCESS SYSTEM 2 | POSITIONAL INFORMATION |
|---|---|---|
| LTE | WLAN | POSITIONAL INFORMATION 1 |

FIG. 9

| FLOW IDENTIFIER | DEGREE OF COMPULSION | ACCESS SYSTEM |
|---|---|---|
| FLOW 2 | SHALL | WLAN |

FIG. 11

| FLOW | DEGREE OF COMPULSION | ACCESS SYSTEM |
|---|---|---|
| FLOW 2 | SHOULD | WLAN |

FIG. 12

| FLOW | DEGREE OF COMPULSION | ACCESS SYSTEM |
|---|---|---|
| FLOW 2 | MAY | WLAN |

| APN IDENTIFIER | ACCESS SYSTEM |
|---|---|
| APN 1 | LTE |
| APN 2 | LTE |
| APN 3 | WLAN |

(b)

| APN IDENTIFIER | ACCESS SYSTEM |
|---|---|
| APN 1 | LTE |
| APN 2 | WLAN |
| APN 3 | WLAN |

FIG. 16

| APN IDENTIFIER | DEGREE OF COMPULSION | ACCESS SYSTEM |
|---|---|---|
| APN 1 | SHALL | LTE |
| APN 2 | SHALL | WLAN |
| APN 3 | SHALL | WLAN |

FIG. 17

| APN IDENTIFIER | DEGREE OF COMPULSION | ACCESS SYSTEM |
|---|---|---|
| APN 2 | SHALL | WLAN |

FIG. 19

| APN IDENTIFIER | DEGREE OF COMPULSION | ACCESS SYSTEM |
|---|---|---|
| APN 2 | SHOULD | WLAN |

FIG. 20

| APN IDENTIFIER | DEGREE OF COMPULSION | ACCESS SYSTEM |
|---|---|---|
| APN 2 | MAY | WLAN |

| PDN CONNECTION IDENTIFIER | ACCESS SYSTEM |
|---|---|
| PDN CONNECTION 1 | LTE |
| PDN CONNECTION 2 | LTE |
| PDN CONNECTION 3 | WLAN |

(b)

| PDN CONNECTION IDENTIFIER | ACCESS SYSTEM |
|---|---|
| PDN CONNECTION 1 | LTE |
| PDN CONNECTION 2 | WLAN |
| PDN CONNECTION 3 | WLAN |

FIG. 24

| PDN CONNECTION IDENTIFIER | DEGREE OF COMPULSION | ACCESS SYSTEM |
|---|---|---|
| PDN CONNECTION 1 | SHALL | LTE |
| PDN CONNECTION 2 | SHALL | WLAN |
| PDN CONNECTION 3 | SHALL | WLAN |

FIG. 25

| PDN CONNECTION IDENTIFIER | DEGREE OF COMPULSION | ACCESS SYSTEM |
|---|---|---|
| PDN CONNECTION 2 | SHALL | WLAN |

FIG. 27

| PDN CONNECTION IDENTIFIER | DEGREE OF COMPULSION | ACCESS SYSTEM |
|---|---|---|
| PDN CONNECTION 2 | SHOULD | WLAN |

FIG. 28

| PDN CONNECTION IDENTIFIER | DEGREE OF COMPULSION | ACCESS SYSTEM |
|---|---|---|
| PDN CONNECTION 2 | MAY | WLAN |

FIG. 29

| FLOW IDENTIFIER | ACCESS NETWORK |
|---|---|
| FLOW 1 | LTE AN 80 |
| FLOW 2 | LTE AN 80 |
| FLOW 3 | WLAN ANa 70 |

FIG. 30

| FLOW IDENTIFIER | DEGREE OF COMPULSION | ACCESS NETWORK |
|---|---|---|
| FLOW 1 | SHALL | LTE AN 80 |
| FLOW 2 | SHALL | WLAN ANa 70 |
| FLOW 3 | SHALL | WLAN ANa 70 |

FIG. 32

| FLOW | DEGREE OF COMPULSION | ACCESS NETWORK |
|---|---|---|
| FLOW 2 | SHOULD | WLAN ANa 70 |

FIG. 33

| FLOW | DEGREE OF COMPULSION | ACCESS NETWORK |
|---|---|---|
| FLOW 2 | MAY | WLAN ANa 70 |

UE, ANDSF, MOBILE COMMUNICATION SYSTEM, PGW, AND COMMUNICATION METHOD

TECHNICAL FIELD

The present invention relates to a mobile communication system or the like including a PGW (Packet Data Network Gateway), UE (User Equipment) that establishes a communication path which uses a first access system and a communication path which uses a second access system with the PGW, and an ANDSF (Access Network Discovery and Selection Function) that transmits a mobile operator policy to the UE.

BACKGROUND ART

The 3GPP (The 3rd Generation Partnership Project), which is the standardization organization for mobile communication systems, is working on development of specifications for an EPS (Evolved Packet System) described in NPL 1 listed below as a next-generation mobile communication system. As an access system connected to the EPS, not only LTE (Long Term Evolution) but also Wireless LAN (WLAN) and WiMAX (Worldwide Interoperability for Microwave Access) are being examined.

Furthermore, the 3GPP is examining a current sharp increase in traffic caused by smartphones accessing the Internet and is assuming that LTE will not be enough to process the traffic. The 3GPP is planning to avoid concentration of traffic in LTE by switching from LTE to other access systems such as Wireless LAN and WiMAX depending on the situation.

In NPL 1, IFOM (IP Flow Mobility) is examined as a technique for avoiding concentration of traffic using a plurality of access systems and specifications thereof are developed. The IFOM is a technique that makes it possible to distribute traffic by assigning an access system for each flow. Here, the flow refers to a group of communication data having a common characteristic, and the characteristics of the communication data can be identified with, for example, a source IP address, a destination IP address, a source port number, a destination IP address, a protocol number (these five parameters are referred to as IP5), or the like.

In addition, in NPL 2, a method used by UE (User Equipment), which is a mobile communication terminal, to use an ANDSF (Access Network Discovery and Selection Function) in a procedure for switching an access system is described. The ANDSF is an apparatus having a function of, for one or a plurality of flows communicated by, or to be communicated by, the UE, selecting an access system for each flow and transmitting the selected access system to the UE as a policy of a Mobile Operator (MO).

The UE holds a policy in which an access system used for each flow is associated with each of the one or the plurality of flows communicated, or to be communicated, thereby. Upon receiving an access system from the ANDSF as an MO policy, the UE determines whether or not to apply the access system included in the MO policy, and if the MO policy is to be applied, the UE causes a UE policy to reflect the MO policy and then switches the access system used for transmitting and receiving the flow on the basis of the policy of the UE.

Here, the UE policy is set by a user in accordance with whether or not connections can be established with a plurality of access systems and billing conditions. For example, the UE policy is a policy that is related to selection of a communication path for the UE and that, for example, determines that use of a communication path through an access network realized by WLAN is given priority if cost is lower when the communication path through the access network realized by WLAN is used than when a communication path through an access network realized by LTE is used.

Therefore, the UE need not necessarily follow the MO policy transmitted from the ANDSF, and if the MO policy is not applied, the UE need not change the UE policy and, in this case, need not switch the access system. Such application is determined by the setting of the UE or setting based on the intention of the user who owns the UE.

CITATION LIST

Non Patent Literature

NPL 1: 3GPP TS 23.261 Technical Specification Group Services and System Aspects, IP flow mobility and seamless Wireless Local Area Network (WLAN) offload, Stage 2 (Release 10)

NPL 2: 3GPP TS23.402 General Technical Specification Group Services and System Aspects, Architecture enhancements for non-3GPP accesses

SUMMARY OF INVENTION

Technical Problem

Now the access system can be switched by the IFOM for each flow. However, although the MO has means for transmitting the policy to the UE, the UE need not select an access system used for communication for a flow in accordance with the MO policy.

When only the MO policy is transmitted, a problem arises in that the concentration of traffic in LTE cannot necessarily be reduced. When the MO monitors the amount of traffic in a communication system and generates an MO policy for optimizing data delivery in the entirety of the communication system, the data delivery is not optimized even by, for example, generating the MO policy such that the traffic to LTE is reduced and the traffic to WLAN is increased and transmitting the MO policy to the UE, because the UE might not switch the access system on the basis of the MO policy.

That is, the operator cannot perform an operation for transmitting the MO policy while providing a degree of compulsion for the UE, and accordingly cannot compel the UE to switch the access system.

For example, when the ANDSF has transmitted an MO policy to the UE, the ANDSF cannot compel the UE to apply the MO policy and switch to the access system included in the MO policy.

In addition, when transmitting the MO policy to the UE, the ANDSF not only cannot compel the UE to apply the MO policy using a degree of compulsion but also cannot transmit a degree of compulsion of the MO policy in such a way as to notify the UE that the application of the MO policy is a desire of the MO or that the UE may arbitrarily apply the MO policy.

The present invention has been conceived in view of such circumstances, and an object thereof is to, when UE (mobile station apparatus) connected to a first access system (for example, an LTE base station apparatus) is performing data communication, enable an MO to compel the UE to apply a mobile operator policy (MO policy) by transmitting the MO policy to the UE from the ANDSF. As a result, the UE changes the UE policy to the MO policy and appropriately reflects the intention of the MO, thereby providing a mobile communication system or the like capable of avoiding concentration of traffic in the first access system (for example, the LTE base station apparatus).

Solution to Problem

In view of the above-described problem, UE in the present invention is UE (User Equipment) in a mobile communication system including a PGW (Packet Data Network Gateway), the UE that establishes, with the PGW, a communication path using a first access system and a communication path using a second access system, and an ANDSF (Access Network Discovery and Selection Function) that transmits a mobile operator policy to the UE. The UE includes receiving the mobile operator policy including flow identification information, access system identification information, and a degree of compulsion from the ANDSF, and transmitting, in a case where the degree of compulsion included in the mobile operator policy is a degree of compulsion that compels the UE to perform switching, a request to forcibly switch a communication path used for flow communication corresponding to the flow identification information to an access system corresponding to the access system identification information included in the mobile operator policy.

Furthermore, the UE in the present invention is UE (User Equipment) in a mobile communication system including a PGW (Packet Data Network Gateway), the UE that establishes, with the PGW, a communication path using a first access system and a communication path using a second access system, and an ANDSF (Access Network Discovery and Selection Function) that transmits a mobile operator policy to the UE. The UE includes receiving the mobile operator policy including an APN identifier, access system identification information, and a degree of compulsion from the ANDSF, and transmitting, in a case where the degree of compulsion included in the mobile operator policy is a degree of compulsion that compels the UE to perform switching, a request to forcibly switch a communication path used for an APN corresponding to the APN identifier to an access system corresponding to the access system identification information included in the mobile operator policy.

Furthermore, the UE in the present invention UE (User Equipment) in a mobile communication system including a PGW (Packet Data Network Gateway), the UE that establishes, with the PGW, a communication path using a first access system and a communication path using a second access system, and an ANDSF (Access Network Discovery and Selection Function) that transmits a mobile operator policy to the UE. The UE includes receiving the mobile operator policy including PDN connection identification information, access system identification information, and a degree of compulsion from the ANDSF, and transmitting, in a case where the degree of compulsion included in the mobile operator policy is a degree of compulsion that compels the UE to perform switching, a request to forcibly switch a communication path used for a PDN connection corresponding to the PDN connection identification information to an access system corresponding to the access system identification information included in the mobile operator policy.

Furthermore, the UE in the present invention is UE (User Equipment) in a mobile communication system including a PGW (Packet Data Network Gateway), the UE that establishes, with the PGW, a communication path through a first access network using a first access system and a communication path through a second access network using a second access system, and an ANDSF (Access Network Discovery and Selection Function) that transmits a mobile operator policy to the UE. The UE includes receiving the mobile operator policy including flow identification information, access network identification information, and a degree of compulsion from the ANDSF, and transmitting, in a case where the degree of compulsion included in the mobile operator policy is a degree of compulsion that compels the UE to perform switching, a request to forcibly switch a communication path used for flow communication corresponding to the flow identification information to an access network corresponding to the access network identification information included in the mobile operator policy.

An ANDSF in the present invention is an ANDSF (Access Network Discovery and Selection Function) in a mobile communication system including a PGW (Packet Data Network Gateway), UE (User Equipment) that establishes, with the PGW, a communication path using a first access system and a communication path using a second access system, and the ANDSF that transmits a mobile operator policy to the UE. The ANDSF includes transmitting the mobile operator policy including flow identification information, access system identification information, and a degree of compulsion to the UE. The degree of compulsion includes a degree of compulsion that, in a case where the UE has received the mobile operator policy, issues an instruction to forcibly switch a communication path used for a flow corresponding to the flow identification information to an access system corresponding to the access system identification information.

The ANDSF in the present invention is an ANDSF (Access Network Discovery and Selection Function) in a mobile communication system including a PGW (Packet Data Network Gateway), UE (User Equipment) that establishes, with the PGW, a communication path using a first access system and a communication path using a second access system, and the ANDSF that transmits a mobile operator policy to the UE. The ANDSF includes transmitting the mobile operator policy including an APN identifier, access system identification information, and a degree of compulsion to the UE. The degree of compulsion includes a degree of compulsion that, in a case where the UE has received the mobile operator policy, issues an instruction to forcibly switch a communication path used for an APN corresponding to the APN identifier to an access system corresponding to the access system identification information.

The ANDSF in the present invention is an ANDSF (Access Network Discovery and Selection Function) in a mobile communication system including a PGW (Packet Data Network Gateway), UE (User Equipment) that establishes, with the PGW, a communication path using a first access system and a communication path using a second access system, and the ANDSF that transmits a mobile operator policy to the UE. The ANDSF includes transmitting the mobile operator policy including PDN connection identification information, access system identification information, and a degree of compulsion to the UE. The degree of compulsion includes a degree of compulsion that, in a case where the UE has received the mobile operator policy, issues an instruction to forcibly switch a communication path used for a PDN connection corresponding to the PDN connection identification information to an access system corresponding to the access system identification information.

The ANDSF in the present invention is an ANDSF (Access Network Discovery and Selection Function) in a mobile communication system including a PGW (Packet Data Network Gateway), UE (User Equipment) that establishes, with the PGW, a communication path through a first access network using a first access system and a communication path through a second access network using a second access system, and the ANDSF that transmits a mobile operator policy to the UE. The ANDSF includes transmitting the mobile operator policy including flow identification information, access network identification information, and a degree of compulsion to the UE. The degree of compulsion includes a degree of compulsion that, in a case where the UE has received the mobile operator policy, issues an instruction to forcibly switch a communication path used for flow communication corresponding to the flow identification information to an access network corresponding to the access network identification information.

A mobile communication system in the present invention is a mobile communication system including a PGW (Packet Data Network Gateway), UE (User Equipment) that establishes, with the PGW, a communication path using a first access system and a communication path using a second access system, and an ANDSF (Access Network Discovery and Selection Function) that transmits a mobile operator policy to the UE. The ANDSF transmits the mobile operator policy including flow identification information, access system identification information, and a degree of compulsion to the UE. The UE receives the mobile operator policy including the flow identification information, the access system identification information, and the degree of compulsion. In a case where the degree of compulsion included in the mobile operator policy is a degree of compulsion that compels the UE to perform switching, a request to forcibly switch a communication path used flow communication corresponding to the flow identification information to an access system corresponding to the access system identification information included in the mobile operator policy is transmitted.

The mobile communication system in the present invention is a mobile communication system including a PGW (Packet Data Network Gateway), UE (User Equipment) that establishes, with the PGW, a communication path using a first access system and a communication path using a second access system, and an ANDSF (Access Network Discovery and Selection Function) that transmits a mobile operator policy to the UE. The ANDSF transmits the mobile operator policy including an APN identifier, access system identification information, and a degree of compulsion to the UE. The UE receives the mobile operator policy including the APN identifier, the access system identification information, and the degree of compulsion. In a case where the degree of compulsion included in the mobile operator policy is a degree of compulsion that compels the UE to perform switching, a request to forcibly switch a communication path used an APN corresponding to the APN identifier to an access system corresponding to the access system identification information included in the mobile operator policy is transmitted.

The mobile communication system in the present invention is a mobile communication system including a PGW (Packet Data Network Gateway), UE (User Equipment) that establishes, with the PGW, a communication path using a first access system and a communication path using a second access system, and an ANDSF (Access Network Discovery and Selection Function) that transmits a mobile operator policy to the UE. The ANDSF transmits the mobile operator policy including PDN connection identification information, access system identification information, and a degree of compulsion to the UE. The UE receives the mobile operator policy including the PDN connection identification information, the access system identification information, and the degree of compulsion. In a case where the degree of compulsion included in the mobile operator policy is a degree of compulsion that compels the UE to perform switching, a request to forcibly switch a communication path used a PDN connection corresponding to the PDN connection identification information to an access system corresponding to the access system identification information included in the mobile operator policy is transmitted.

The mobile communication system in the present invention is a mobile communication system including a PGW (Packet Data Network Gateway), UE (User Equipment) that establishes, with the PGW, a communication path through a first access network using a first access system and a communication path through a second access network using a second access system, and an ANDSF (Access Network Discovery and Selection Function) that transmits a mobile operator policy to the UE. The ANDSF transmits the mobile operator policy including flow identification information, access network identification information, and a degree of compulsion to the UE. The UE receives the mobile operator policy including the flow identification information, the access network identification information, and the degree of compulsion. In a case where the degree of compulsion included in the mobile operator policy is a degree of compulsion that compels the UE to perform switching, a request to forcibly switch a communication path used flow communication corresponding to the flow identification information to an access network corresponding to the access network identification information included in the mobile operator policy is transmitted.

A PGW in the present invention is connected to any of the above-described mobile communication systems.

A communication method in the present invention is a communication method used by a mobile communication system including a PGW (Packet Data Network Gateway), UE (User Equipment) that establishes, with the PGW, a communication path using a first access system and a communication path using a second access system, and an ANDSF (Access Network Discovery and Selection Function) that transmits a mobile operator policy to the UE. The ANDSF transmits the mobile operator policy including flow identification information, access system identification information, and a degree of compulsion to the UE. The UE receives the mobile operator policy including the flow identification information, the access system identification information, and the degree of compulsion. In a case where the degree of compulsion included in the mobile operator policy is a degree of compulsion that compels the UE to perform switching, a request to forcibly switch a communication path used flow communication corresponding to the flow identification information to an access system corresponding to the access system identification information included in the mobile operator policy is transmitted.

The communication method in the present invention is a communication method used by a mobile communication system including a PGW (Packet Data Network Gateway), UE (User Equipment) that establishes, with the PGW, a communication path using a first access system and a communication path using a second access system, and an ANDSF (Access Network Discovery and Selection Function) that transmits a mobile operator policy to the UE. The ANDSF transmits the mobile operator policy including an APN identifier, access system identification information, and a degree of compulsion to the UE. The UE receives the mobile operator policy including the APN identifier, the access system identification information, and the degree of compulsion. In a case where the degree of compulsion included in the mobile operator policy is a degree of compulsion that compels the UE to perform switching, a request to forcibly switch a communication path used an APN corresponding to the APN identifier to an access system corresponding to the access system identification information included in the mobile operator policy is transmitted.

The communication method in the present invention is a communication method used by a mobile communication system including a PGW (Packet Data Network Gateway), UE (User Equipment) that establishes, with the PGW, a communication path using a first access system and a communication path using a second access system, and an ANDSF (Access Network Discovery and Selection Function) that transmits a mobile operator policy to the UE. The ANDSF transmits the mobile operator policy including PDN connection identification information, access system identification information, and a degree of compulsion to the UE. The UE receives the mobile operator policy including the PDN connection identification information, the access system identification information, and the degree of compulsion. In a case where the degree of compulsion included in the mobile operator policy is a degree of compulsion that compels the UE to perform switching, a request to forcibly switch a communication path used a PDN connection corresponding to the PDN connection identification information to an access system corresponding to the access system identification information included in the mobile operator policy is transmitted.

The communication method in the present invention is a communication method used by a mobile communication system including a PGW (Packet Data Network Gateway), UE (User Equipment) that establishes, with the PGW, a communication path through a first network using a first access system and a communication path through a second network using a second access system, and an ANDSF (Access Network Discovery and Selection Function) that transmits a mobile operator policy to the UE. The ANDSF transmits the mobile operator policy including flow identification information, access network identification information, and a degree of compulsion to the UE. The UE receives the mobile operator policy including the flow identification information, the access network identification information, and the degree of compulsion. In a case where the degree of compulsion included in the mobile operator policy is a degree of compulsion that compels the UE to perform switching, a request to forcibly switch a communication path used flow communication corresponding to the flow identification information to an access network corresponding to the access network identification information included in the mobile operator policy is transmitted.

Advantageous Effects of Invention

According to the present invention, the mobile operator (MO) is able to transmit an MO policy to the UE while providing a degree of compulsion for the MO policy and perform an operation for compelling the UE to switch the access system, thereby appropriately reducing concentration of traffic in LTE.

That is, when the ANDSF transmits the MO policy to the UE, the ANDSF is able to transmit the degree of compulsion for application of the MO policy as compulsion and compel the UE to switch to an access system included in the MO policy.

In addition, when transmitting the MO policy to the UE, the ANDSF is not only able to compel the UE to apply the MO policy using a degree of compulsion but also able to notify the UE that the application of the MO policy is a desire of the MO or that the UE may arbitrarily apply the MO policy.

BRIEF DESCRIPTION OF DRAWINGS

FIG. 3 is diagrams illustrating examples of the data configuration of a UE policy according to the first embodiment.

FIG. 6 is diagrams illustrating the configuration of an IP mobile communication network.

FIG. 8 is a diagram illustrating an example of access system information according to the first embodiment (first example).

FIG. 9 is a diagram illustrating an example of the MO policy according to the first embodiment (first example).

FIG. 11 is a diagram illustrating an example of the access system information according to the first embodiment (second example).

FIG. 12 is a diagram illustrating an example of the access system information according to the first embodiment (third example).

FIG. 15 is diagrams illustrating examples of the data configuration of a UE policy according to a second embodiment.

FIG. 16 is a diagram for explaining the data configuration of an MO policy according to the second embodiment.

FIG. 17 is a diagram illustrating an example of access system information according to the second embodiment (first example).

FIG. 19 is a diagram illustrating an example of the access system information according to the second embodiment (second example).

FIG. 20 is a diagram illustrating an example of the access system information according to the second embodiment (third example).

FIG. 23 is diagrams illustrating examples of the data configuration of a UE policy according to a third embodiment.

FIG. 24 is a diagram for explaining the data configuration of an MO policy according to the third embodiment.

FIG. 25 is a diagram for explaining the data configuration of the MO policy according to the third embodiment (first example).

FIG. 27 is a diagram illustrating an example of access system information according to the third embodiment (second example).

FIG. 28 is a diagram illustrating the access system information according to the third embodiment (third example).

FIG. 29 is a diagram illustrating an example of the data configuration of a UE policy according to a fourth embodiment.

FIG. 30 is a diagram illustrating an example of the data configuration of an MO policy according to the fourth embodiment.

FIG. 32 is a diagram illustrating an example of access system information according to the fourth embodiment (second example).

FIG. 33 is a diagram illustrating an example of the access system information according to the fourth embodiment (third example).

DESCRIPTION OF EMBODIMENTS

Best modes for implementing the present invention will be described hereinafter with reference to the drawings. It is to be noted that, in this embodiment, for example, embodiments of a mobile communication system when the present invention is applied will be described in detail with reference to the drawings.

1. First Embodiment

First, a first embodiment to which the present invention is applied will be described with reference to the drawings.

[1.1 Outline of Mobile Communication System]

Figure 1:
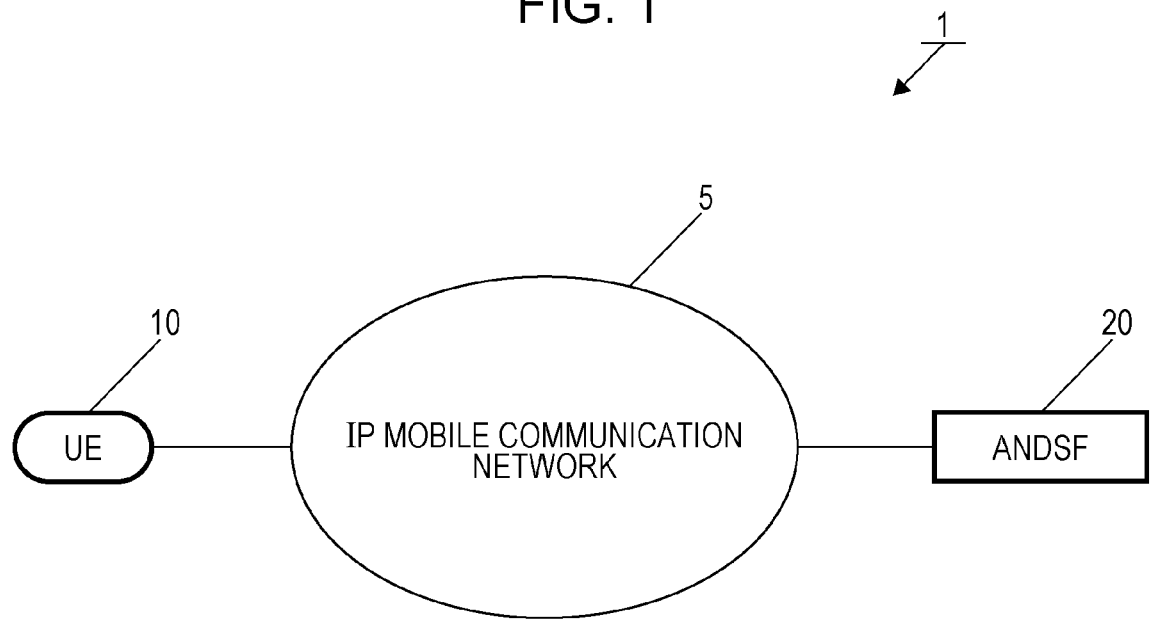
FIG. 1 is a diagram for explaining an outline of a mobile communication system 1 according to embodiments.

FIG. 1 is a diagram for explaining the outline of a mobile communication system 1 according to this embodiment. As illustrated in the figure, the mobile communication system 1 is configured by connecting UE (mobile station apparatus) 10 and an ANDSF (communication path selection policy management apparatus) 20 (Access Network Discovery and Selection Function) through an IP mobile communication network 5.

The IP mobile communication network 5 may be, for example, a network configured by a wireless access network and a core network operated by a mobile telecommunications carrier or may be a broadband network operated by a fixed-line telecommunications carrier. An IP mobile communication network operated by a mobile telecommunications carrier will be described in detail later.

In addition, the broadband network refers to an IP communication network operated by a mobile communications carrier that connects using ADSL (Asymmetric Digital Subscriber Line) or the like and that provides high-speed communication through a digital line such as an optical fiber. Furthermore, the IP mobile communication network 5 may be a network that is wirelessly accessed using WiMAX (Worldwide Interoperability for Microwave Access) or the like, instead.

The UE 10 is a mobile communication terminal that connects using an access system such as LTE or WLAN, and is capable of connecting to an IP access network by incorporating a communication interface for 3GPP LTE, a communication interface for WLAN, or the like and establishing a connection.

The ANDSF 20 is connected to an IP access network using a wired line or the like. For example, the wired line is constructed by ADSL (Asymmetric Digital Subscriber Line), an optical fiber, or the like. However, the ANDSF 20 may be connected to an IP access network by a wireless access network such as LTE (Long Term Evolution), WLAN (Wireless LAN), WiMAX (Worldwide Interoperability for Microwave Access), or the like, instead.

[1.2 Configurations of Apparatuses]

Next, the configuration of each apparatus will be briefly described with reference to the drawings.

[1.2.1 Configuration of UE]

Figure 2:
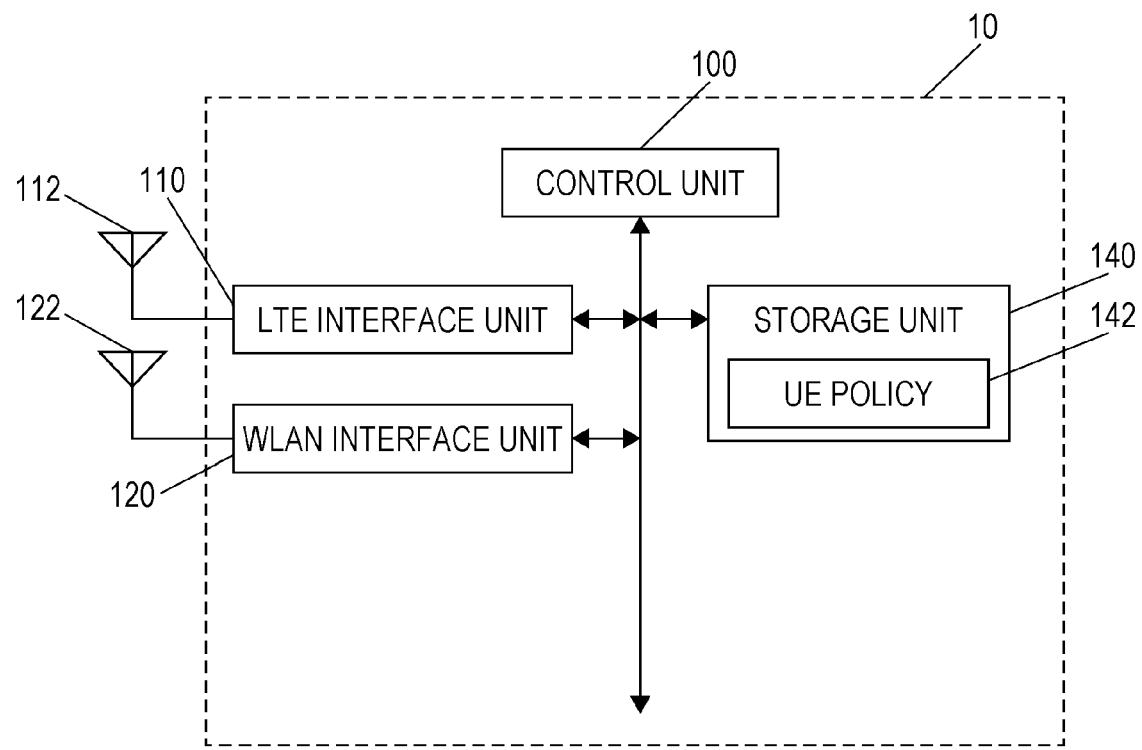
FIG. 2 is a diagram for explaining the functional configuration of UE according to a first embodiment.

FIG. 2 illustrates the functional configuration of the UE 10 according to this embodiment. In the UE 10, an LTE interface unit 110, a WLAN interface unit 120, and a storage unit 140 are connected to a control unit 100 through a bus.

The control unit 100 is a functional unit for controlling the UE 10. The control unit 100 realizes various processes by reading and executing various programs stored in the storage unit 140.

The LTE interface unit 110 is a functional unit for enabling the UE 10 to connect to an LTE base station and to an IP access network. In addition, an external antenna 112 is connected to the LTE interface unit 110.

The WLAN interface unit 120 is a functional unit for enabling the UE 10 to connect to a WLAN access point and to an IP access network. In addition, an external antenna 122 is connected to the WLAN interface unit 120.

The storage unit 140 is a functional unit that stores programs, data, and the like necessary for various operations of the UE 10. The storage unit 140 is configured by, for example, a semiconductor memory, an HDD (Hard Disk Drive), or the like. Furthermore, the storage unit 140 stores a UE policy 142.

FIG. 3 is a diagram illustrating an example of the UE policy 142. For example, as illustrated in FIG. 3(a), the UE policy 142 stores a flow identifier (for example, "Flow 1") and an access system (for example, "LTE") while associating the flow identifier and the access system with each other, in order to manage an access system adopted by the UE 10 for each flow.

Here, a flow refers to a flow of data that can be identified with a source IP address, a destination IP address, a source port number, a destination port number, a protocol number, or the like. Alternatively, the flow may be one of various pieces of transmitted or received data such as data transmitted and received for a certain period from a certain point of time and data that can be identified with its QoS level, instead. In addition, the access system need not be LTE, but may be WLAN or WiMAX, instead.

[1.2.2 Configuration of ANDSF]

Figures 4, 5:
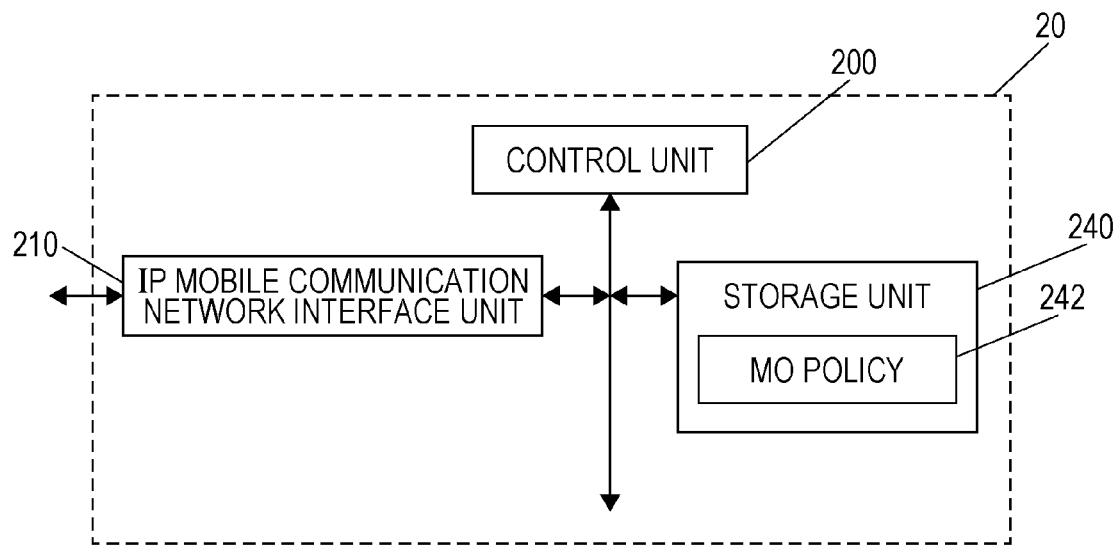
FIG. 4 is a diagram for explaining the functional configuration of an ANDSF according to the first embodiment.
FIG. 5 is a diagram for explaining the functional configuration of an MO policy according to the first embodiment.

Next, FIG. 4 illustrates the functional configuration of the ANDSF 20 according to this embodiment. In the ANDSF 20, an IP mobile communication network interface unit 210 and a storage unit 240 are connected to a control unit 200 through a bus.

The control unit 200 is a functional unit for controlling the ANDSF 20. The control unit 200 realizes various processes by reading and executing various programs stored in the storage unit 240.

The IP mobile communication network interface unit 210 is a functional unit for enabling the ANDSF 20 to connect to an IP mobile communication network.

The storage unit 240 is a functional unit that stores programs, data, and the like necessary for various operations of the ANDSF 20. The storage unit 140 is configured by, for example, a semiconductor memory, an HDD (Hard Disk Drive), or the like. Furthermore, the storage unit 240 stores an MO policy 242.

FIG. 5 is a diagram illustrating an example of the MO policy 242. For example, as illustrated in FIG. 5, the MO policy 242 stores a flow identifier (for example, "Flow 1"), a degree of compulsion (for example, "shall"), and an access system (for example, "LTE") while associating the flow identifier, the degree of compulsion, and the access system with one another, in order to manage an access system adopted by the ANDSF 20 for each flow transmitted to the UE 10.

Here, the degree of compulsion indicates whether or not the UE 10 adopts the MO policy 242 transmitted from the ANDSF 20. In the case of "shall", the degree of compulsion is high, and, with respect to an access system for a flow transmitted from the ANDSF 20 to the UE 10 with the degree of compulsion "shall", the access system must be used for the flow. That is, the MO policy 242 transmitted from the ANDSF 20 to the UE 10 must be applied to the UE policy 142.

For example, in the case of Flow 2 in the UE policy illustrated in FIG. 3(*a*), the access system is LTE. On the other hand, in the case of Flow 2 in the MO policy 242 illustrated in FIG. 5, the access system is WLAN. In this case, because Flow 2 in the MO policy 242 must be applied to Flow 2 in the UE policy 142 when the ANDSF 20 has transmitted an entry (the degree of compulsion "shall" and the access system "WLAN") of Flow 2 in the MO policy 242 to the UE 10, the access system for Flow 2 is changed to WLAN as indicated in a UE policy after the change illustrated in FIG. 3(*b*).

[1.2.3 Example of Configuration of IP Mobile Communication Network]

As illustrated in FIG. 6, a mobile communication system is configured by the UE 10, the IP mobile communication network 5, and a PDN 9 (Packet Data Network). Furthermore, the IP mobile communication network 5 is configured by a core network 7 and wireless access networks. The detailed configuration of the core network is illustrated in FIG. 6(*a*).

It is to be noted that the PDN 9 is a network with which data can be communicated using packets and is, for example, the Internet or an IMS.

The core network 7 is configured by including a PGW (access control apparatus) 30 (Packet Data Network Gateway), an SGW 35 (Serving Gateway), an MME 40 (Mobile Management Entity), an HSS 50 (Home Subscriber Server), an AAA 55 (Authentication, Authorization, Accounting), a PCRF 60 (Policy and Charging Rules Function), and an ePDG 65 (enhanced Packet Data Gateway).

The wireless access networks may be configured by a plurality of different access networks. Each access network is connected to the core network 7. Furthermore, the UE 10 can wirelessly connect to the wireless access networks.

As the wireless access networks, an LTE access network (LTE AN 80) to which the UE 10 can connect using an LTE access system and access networks to which the UE 10 can connect using a WLAN access system may be configured.

Furthermore, as the access networks to which the UE 10 can connect using the WLAN access system, a WLAN access network b (WLAN ANb 75) to which the ePDG 65 is connected as a connection apparatus to the core network and a WLAN access network a (WLAN ANa 70) connected to the PGW 30, the PCRF 60, and the AAA 55 may be configured.

Because each apparatus is configured in the same manner as an existing apparatus in a mobile communication system that uses an EPS, detailed description of such an apparatus is omitted, but the function of each apparatus will be briefly described. The PGW 30 is connected to the PDN 9, the SGW 35, the ePDG 65, the WLAN ANa, the PCRF 60, and the AAA 55, and delivers user data as a gateway apparatus between the PDN 9 and the core network 7.

The SGW 35 is connected to the PGW 30, the MME 40, and the LTE AN 80, and delivers the user data as a gateway apparatus between the core network 7 and the LTE AN 80.

The MME 40 is connected to the SGW 35 and the LTE AN 80, and is an access control apparatus that controls access from the UE 10 through the LTE AN 80.

The HSS 50 is connected to the SGW 35 and the AAA 55, and manages subscriber information. In addition, the AAA 55 is connected to the PGW 30, the HSS 50, the PCRF 60, and the WLAN ANa 70, and controls access from the UE 10 connected through the WLAN ANa 70. The PCRF 60 is connected to the PGW 30, the WLAN ANa 70, and the AAA 55, and performs QoS management for data delivery.

The ePDG 65 is connected to the PGW 30 and the WLAN ANb 75, and delivers the user data as a gateway apparatus between the core network 7 and the WLAN ANb 75.

In addition, as illustrated in FIG. 6(*b*), each wireless access network includes an apparatus (for example, a base station apparatus or an access point apparatus) or the like to which the UE 10 is actually connected. Each apparatus used for the connection may be one of various apparatuses that are adapted to the wireless access networks, but in this embodiment, the LTE AN 80 is configured by including an eNB 45. The eNB 45 is a wireless base station to which the UE 10 connects using the LTE access system, and the LTE AN 80 may be configured by including one or a plurality of wireless base stations.

Furthermore, the WLAN ANa 70 is configured by including a WLAN APa 72 and a GW 74 (Gateway). The WLAN AP 72 is a wireless base station to which the UE 10 connects using the WLAN access system, and the WLAN ANa 70 may be configured by including one or a plurality of wireless base stations. The GW 74 is a gateway apparatus between the core network 7 and the WLAN ANa 70. Alternatively, the WLAN APa 72 and the GW 74 may be configured as a single apparatus.

As described above, the gateway included in the WLAN ANa 70 is capable of connecting to a plurality of apparatuses in the core network. When a provider who operates the core network and a provider who operates the WLAN ANa 70 are different, such a configuration may be used if a trusting relationship is built between the providers through a contract, an agreement, or the like for the operation. In other words, the WLAN APa 72 is a reliable access network for the provider who operates the core network 7.

In addition, the WLAN ANb 75 is configured by including a WLAN APb 76. The WLAN APb 76 is a wireless base station to which the UE 10 connects using the WLAN access system, and the WLAN ANb 75 may be configured by including one or a plurality of wireless base stations.

As described above, the WLAN ANb 75 is connected to the core network 7 using the ePDG 65, which is an apparatus included in the core network 7, as a gateway. The ePDG 65 has a security function for securing safety. When the provider who operates the core network and the provider who operates the WLAN ANa 70 are different, such a configuration is used if a trusting relationship is not built between the providers through a contract, an agreement, or the like for the operation. In other words, the WLAN APa is not a reliable access network for the provider who operates the core network 7, and the ePDG 65 included in the core network 7 provides safety.

It is to be noted that connection of the UE 10 to each wireless access network herein refers to connection to a base station apparatus, an access point, or the like included in each wireless access network, and data, signals, and the like are transmitted and received through the base station apparatus or the access point.

For example, connection of the UE 10 to the LTE AN 80 refers to connection of the UE 10 through the eNB 45, and connection to the WLAN ANa 70 refers to connection through the WLAN APa 72 and/or the GW 74. In addition, connection of the UE 10 to the WLAN ANb 75 refers to connection of the UE 10 to the WLAN APb 76.

1.3 Examples

1.3.1 First Example

Next, specific examples of processes performed in the above-described mobile communication system will be described. First, as a first example, a procedure for switching, for Flow 2, from transmission and reception of data using a communication path through the access system LTE (through the eNB 45, the SGW 35, and the PGW 30) to transmission and reception of data using a communication path through WLAN (through the WLAN ANa 70 and the PGW 30) by transmitting, as the MO policy 242 illustrated in FIG. 5, the degree of compulsion "shall" and the access system "WLAN" from the ANDSF 20 to the UE 10 for Flow 2 and causing the UE policy 142 to reflect the MO policy 242 in a state in which the UE 10 is connected to the base station apparatus (eNB 45) of the LTE AN 80 and the apparatuses (the WLAN APa 72 and/or the GW 74) of the WLAN ANa 70 and in a state in which, in accordance with the UE policy before the change illustrated in FIG. 3(*a*), Flow 1 is communicated using a communication path through LTE (through the eNB 45, the SGW 35, and the PGW 30), Flow 2 is communicated using a communication path through LTE (through the eNB 45, the SGW 35, and the PGW 30), and Flow 3 is communicated using a communication path through WLAN (through the WLAN ANa 70 and the PGW 30) will be described.

It is to be noted that each communication path can be identified with its access system, and the UE 10, the PGW 30, and the ANDSF 20 perform the procedure using the access systems as identification information regarding the communication paths.

As described above, it is possible for an MO to select an access system used by the UE 10 to communicate flows and transmit the selected access system using an MO policy.

It is to be noted that although the procedure for switching from the transmission and reception of data through LTE (through the eNB 45, the SGW 35, and the PGW 30) to the transmission and reception of data through WLAN (through the WLAN ANa 70 and the PGW 30) will be described in this embodiment, it is possible to switch from the transmission and reception of data through LTE (through the eNB 45, the SGW 35, and the PGW 30) to transmission and reception of data through WiMAX (for example, through WiMAX and the PGW) using the same procedure by transmitting, as the MO policy 242 illustrated in FIG. 5, the degree of compulsion shall and the access system WiMAX from the ANDSF 20 to the UE 10, instead.

The procedure will be sequentially described with reference to FIG. 7. The UE 10 connects to the LTE AN 80 and the WLAN ANa 70 and begins communication (S902). At this time, it is assumed that the UE 10 transmits and receives data through LTE (through the eNB 45, the SGW 35, and the PGW 30) for Flow 1, through LTE (through the eNB 45, the SGW 35, and the PGW 30) for Flow 2, and through WLAN (through the WLAN ANa 70 and the PGW 30) for Flow 3 on the basis of the UE policy illustrated in FIG. 3(*a*). In addition, through the WLAN ANa 70 refers to connection through the WLAN APa 72 and/or the GW 74.

Next, the UE 10 searches for the ANDSF 20 and secures secure communication with the found ANDSF 20 (S904). There can be various methods by which the UE 10 searches for the ANDSF 20, but, for example, the UE 10 can search for the ANDSF 20 by making an inquiry to a DNS server arranged in the PDN. In addition, there can be various methods for securing secure communication between the UE 10 and the ANDSF 20, but, for example, IPSec may be used.

Next, the UE 10 transmits a request for access system information to the ANDSF 20 (S906). At this time, as illustrated in FIG. 8, the request for access system information includes access systems that can be used by the UE 10 and positional information regarding the UE 10. Here, as the access systems that can be used by the UE 10, "LTE", which is Access System 1, and "WLAN", which is Access System 2, are included. As the positional information, positional information regarding Access System 1 is included, but a cell ID of an LTE base station apparatus, a TAI (Tracking Area ID), information regarding the GPS (Global Positioning System), or the like may be included, instead.

Upon receiving the request for access system information from the UE 10, the ANDSF 20 transmits a response of the access system information to the UE 10 (S908). The MO transmits an MO policy to the UE 10 through the response of the access system information. More specifically, as illustrated in FIG. 9, a flow identifier "Flow 2", the degree of compulsion "shall", and the access system "WLAN" are included. Here, the degree of compulsion "shall" indicates that the UE 10 is compelled to use WLAN for Flow 2, and upon receiving an entry including the degree of compulsion "shall", the UE 10 must use the access system (WLAN) included in the entry for the flow (Flow 2).

It is to be noted that although the ANDSF 20 transmits the MO policy 242 to the UE 10 as the response of the access system information after receiving the request for access system information from the UE 10 in this embodiment, the ANDSF 20 may transmit the MO policy 242 to the UE 10 at an arbitrary timing without receiving a request from the UE 10, instead.

Upon receiving the response of the access system information, the UE 10 determines selection of an access system and switching of the access system used for the flow in accordance with information included in the response of the access system information (S910). Here, since the response of the access system information includes information regarding the degree of compulsion "shall" and the access system "WLAN" for Flow 2, the access system LTE for Flow 2 in the UE policy 142 before the change illustrated in FIG. 3(*a*) is changed to the access system WLAN for Flow 2 in the UE policy 142 as indicated in the UE policy after the change illustrated in FIG. 3(*b*). That is, the UE 10 changes the access system for Flow 2 from LTE to WLAN and determines the switching of the access system.

Although an example in which the UE 10 connects to the LTE AN 80 and the WLAN ANa 70 and receives the MO policy in a state in which the communication has begun (S902) has been described in this embodiment, the UE 10 may receive the MO policy while connecting to either the LTE AN 80 or the WLAN ANa 70, instead.

Next, the UE 10 executes switching of the access system. A specific procedure for switching the access system will be described with reference to FIG. 10.

It is to be noted that when the UE 10 is connected to a plurality of access networks of the WLAN access system, the UE 10 may hold a policy for selecting an access network in advance and select an access network on the basis of the policy, or may arbitrarily select an access network. When the number of access networks of the WLAN access system to which the UE 10 is connected is one, the UE 10 selects the access network. In the following example, an example will be described in which the UE 10 selects the WLAN ANa 70 as the access network and performs the procedure for switching the access system.

First, the procedure for switching the access system begins when the UE 10 has transmitted an IP flow mobility trigger to the WLAN ANa 70 to request the WLAN ANa 70 to switch the access system used for communication for a flow (S1002).

The UE 10 transmits the IP flow mobility trigger while including identification information regarding a flow for which the switching is requested and identification information regarding an access system set as a result of the switching in the IP flow mobility trigger on the basis of the UE policy. Here, transmission to the WLAN ANa 70 refers to transmission to an apparatus (for example, the WLAN APa 72 or the GW 74) included in the WLAN ANa 70.

Next, the WLAN ANa 70 transmits proxy binding update to the PGW 30 to make a request to switch the access system used by the UE 10 for communicating the flow (S1004). At this time, the WLAN ANa 70 notifies the PGW 30 that, as a routing policy, transmission and reception of data through LTE (through the PGW 30, the SGW 35, and the eNB 45) are to be switched to transmission and reception of data through WLAN (through the PGW 30 and the WLAN ANa 70) for Flow 2.

The WLAN ANa 70 transmits the proxy binding update while including the identification information regarding the flow for which the switching is requested and the identification information regarding the access system set as a result of the switching in the proxy binding update. Here, transmission from the WLAN ANa 70 refers to transmission from an apparatus (for example, the WLAN APa 72 or the GW 74) included in the WLAN ANa 70.

Upon receiving the proxy binding update, the PGW 30 begins a procedure for changing an IP-CAN session (S1006). First, the PGW 30 transmits an IP-CAN change request to the PCRF 60. At this time, the PGW 30 provides an updated routing rule for the PCRF 60. That is, a database is updated such that Flow 2 for which the transmission and reception of data through LTE (through the PGW 30, the SGW 35, and the eNB 45) are being performed is switched to the transmission and reception of data through WLAN (the PGW 30 and the WLAN ANa 70).

Here, the PGW 30 manages the identification information regarding the flow and a communication path used by the flow while associating the identification information and the communication path with each other as a binding. The identification information regarding the flow is, for example, a source IP address, a destination IP address, a source port number, a destination port number, or a protocol number of packets or the like. The communication path may be managed by identifying the communication path with its access system or may be managed by adding identification information to each communication path through each access system. In doing so, data can be transmitted and received by selecting a communication path for each flow.

Next, a procedure for changing a GW control session and a QoS rule is performed. That is, the PGW 30 changes, for Flow 2, the transmission and reception of data through LTE (through the PGW 30, the SGW 35, and the eNB 45) to the transmission and reception of data through the WLAN ANa 70 (the PGW 30 and the WLAN ANa 70). At this time, the QoS of the transmission and reception of data through the WLAN ANa 70 (the PGW 30 and the WLAN ANa 70) for Flow 2 is changed.

Next, the PGW 30 confirms completion of the update of the binding, the change of the IP-CAN session, and the procedure for changing the GW control session and the QoS rule, and transmits a proxy binding response to the WLAN ANa 70 to permit the request from the UE 10 (S1010). Upon receiving the proxy binding response, the WLAN ANa 70 transmits an IP flow mobility ack to permit the request from the UE 10 (S1012).

On the other hand, the PCRF 60 performs the procedure for changing the GW control session and the QoS rule (S1014). That is, the PCRF 60 ends the transmission and reception of data through LTE for Flow 2. At this time, the QoS of the transmission and reception of data through LTE (through the PGW 30, the SGW 35, and the eNB 45) for Flow 2 is changed.

As a result of the above procedure, the UE 10 and the PGW 30 switch the communication path from one through LTE (through the PGW 30, the SGW 35, and the eNB 45) to one through the WLAN ANa 70 (the PGW 30 and the WLAN ANa 70), and continue the communication of Flow 2.

As described above, the transmission and reception of data through LTE (through the PGW 30, the SGW 35, and the eNB 45) can be switched to the transmission and reception of data through WLAN (the WLAN ANa 70 and the PGW 30) for Flow 2 when the ANDSF 20 has transmitted the degree of compulsion "shall" and the access system WLAN to the UE 10 for Flow 2.

In other words, the MO may cause the UE 10 to perform switching according to the MO policy by transmitting, to the UE 10, a switching instruction that compels the UE 10 to perform the switching.

1.3.2 Second Example

Next, a second example will be described. In the second example, the ANDSF 20 does not use the configuration illustrated in FIG. 9 but uses a configuration illustrated in FIG. 11 for the response of the access system information transmitted to the UE 10 (S908). A difference between the configuration illustrated in FIG. 9 and the configuration illustrated in FIG. 11 is that not the degree of compulsion "shall" but a degree of compulsion "should" is used. The degree of compulsion "should" indicates a desire of the MO, which means that the UE 10 need not necessarily cause the UE policy 142 to reflect the MO policy 242.

Figure 7:
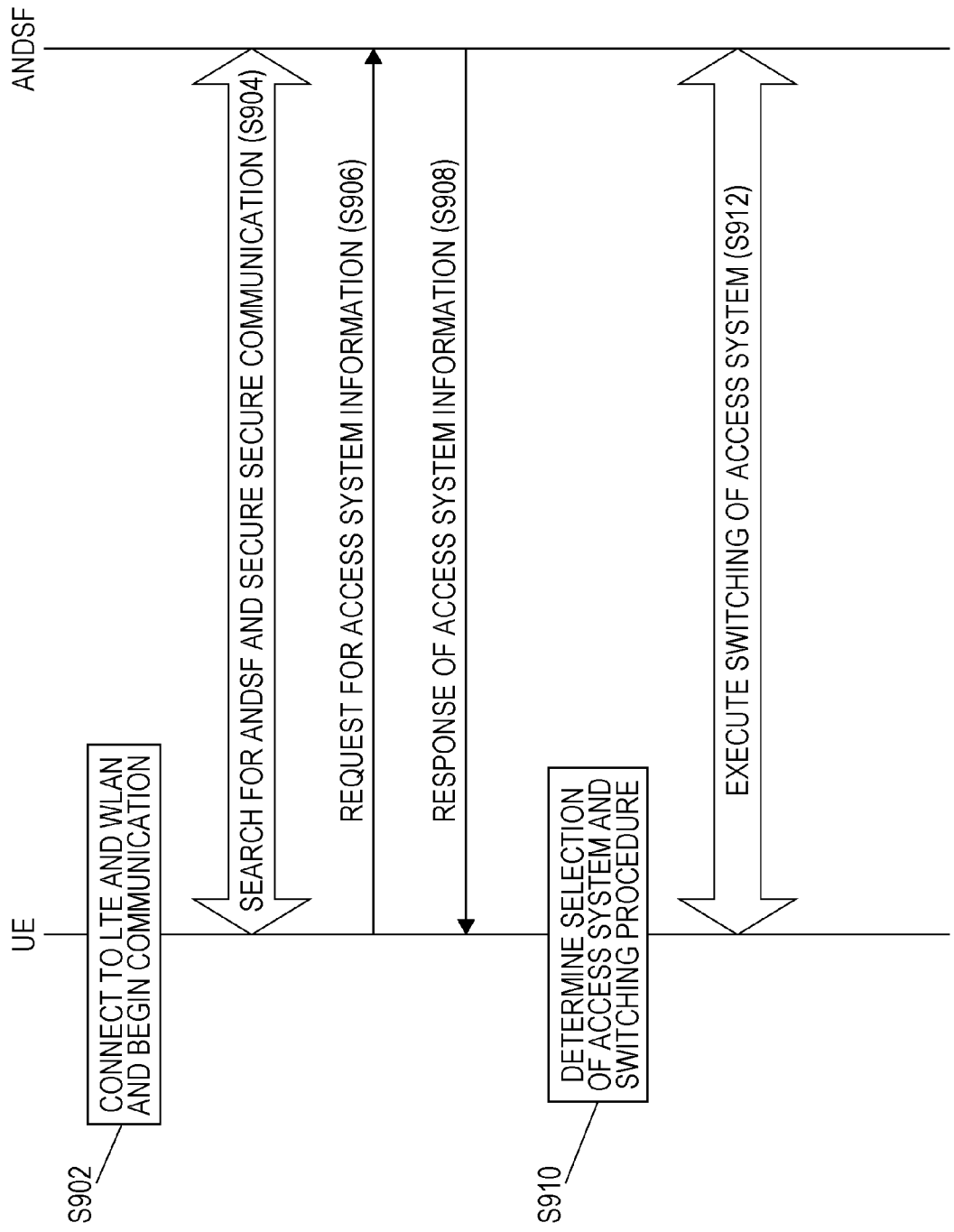
FIG. 7 is a diagram for explaining a processing flow of the UE and the ANDSF.

That is, upon receiving the degree of compulsion "should" as the response of the access system information in S908 illustrated in FIG. 7, the UE 10 selects whether or not to cause the UE policy 142 to reflect the MO policy 242. If the MO policy 242 is to be changed as the UE policy 142, the MO policy 242 is changed to the UE policy after the change illustrated in FIG. 3(*b*). A shifting procedure when the UE 10 that has changed the UE policy 142 has changed is as described above, that is, the processing in S910 and S912 illustrated in FIG. 7 is executed. Thereafter, the same switching procedure as that in the first example is performed.

As a result of the above procedure, the UE 10 and the PGW 30 switch the communication path from one through LTE (through the PGW 30, the SGW 35, and the eNB 45) to one through the WLAN ANa 70 (the PGW 30 and the WLAN ANa 70), and continue the communication of Flow 2.

On the other hand, if the UE 10 does not change the MO policy 242 as the UE policy 142, the UE policy before the change illustrated in FIG. 3(*a*) is not changed. If the UE 10 does not change the UE policy 142, the procedure ends.

1.3.3 Third Example

Next, a third example will be described. In the third example, the ANDSF 20 does not use the configuration illustrated in FIG. 9 or the configuration illustrated in FIG. 11 but uses a configuration illustrated in FIG. 12 for the response of the access system information transmitted to the UE 10 (S908).

A difference between the configurations illustrated in FIGS. 9 and 11 and the configuration illustrated in FIG. 12 is that a degree of compulsion "may" is used instead of the degree of compulsion "shall" and the degree of compulsion "should". The degree of compulsion "may" indicates that the degree of compulsion set by the MO is low and the UE 10 may arbitrarily determine whether or not to use the MO policy 242.

That is, upon receiving the degree of compulsion "may" as the response of the access system information in S908 illustrated in FIG. 7, the UE 10 selects whether or not to cause the UE policy 142 to reflect the MO policy 242. If the MO policy 242 is to be changed as the UE policy 142, the MO policy 242 is changed to the UE policy after the change illustrated in FIG. 3(b). A shifting procedure when the UE 10 that has changed the UE policy 142 has changed is as described above, that is, the processing in S910 and S912 illustrated in FIG. 7 is executed. Thereafter, the same switching procedure as that in the first example is performed.

As a result of the above procedure, the UE 10 and the PGW 30 switch the communication path from one through LTE (through the PGW 30, the SGW 35, and the eNB 45) to one through the WLAN ANa 70 (the PGW 30 and the WLAN ANa 70), and continue the communication of Flow 2.

On the other hand, if the UE 10 does not change the MO policy 242 as the UE policy 142, the UE policy before the change illustrated in FIG. 3(a) is not changed. If the UE 10 does not change the UE policy 142, the procedure ends.

1.3.4 Fourth Example

Figure 13:
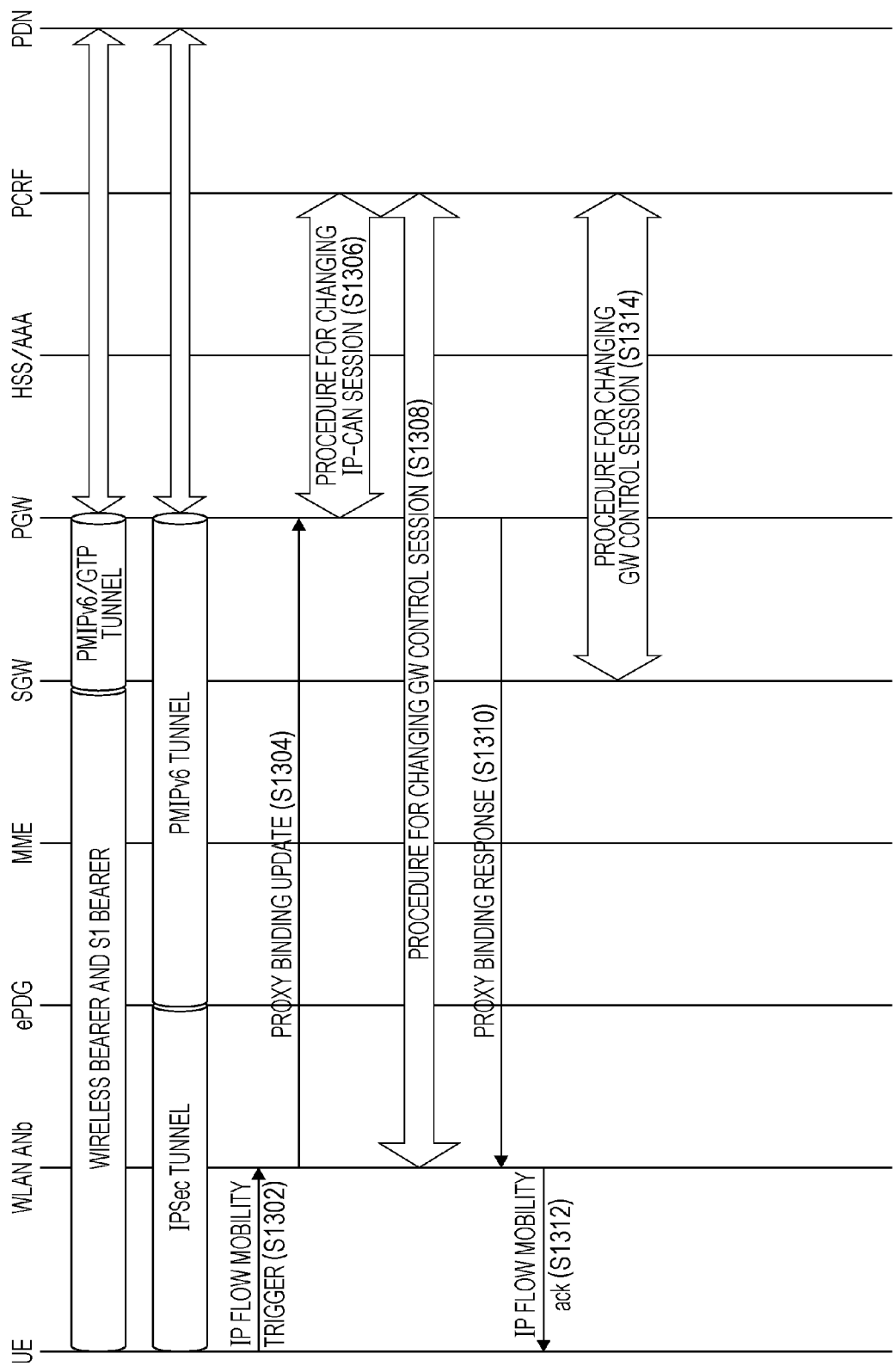
FIG. 13 is a diagram for explaining the switching of the access system according to the first embodiment (fourth example).

Next, a fourth example will be described. In the fourth example, not the procedure illustrated in FIG. 10 but a procedure illustrated in FIG. 13 is used in S912 illustrated in FIG. 7. A difference between the procedure illustrated in FIG. 10 and the procedure illustrated in FIG. 13 is that an access network to be connected is different. Whereas the WLAN ANa 70 is connected in the procedure illustrated in FIG. 10, the WLAN ANb 75 is connected in the procedure illustrated in FIG. 13.

As described in the first example, when the UE 10 is connected to a plurality of access networks of the WLAN access system, the UE 10 may hold a policy for selecting an access network in advance and select an access network on the basis of the policy, or may arbitrarily select an access network. When the number of access networks of the WLAN access system to which the UE 10 is connected is one, the UE 10 selects the access network. In the following example, an example will be described in which the UE 10 selects the WLAN ANb 75 as the access network and performs the procedure for switching the access system.

That is, the UE 10 switches from communication through LTE (through the PGW 30, the SGW 35, and the eNB 45) to not communication through WLAN through the WLAN ANa 70 and the PGW 30 but communication through WLAN through the WLAN ANb 75, the ePDG 65, and the PGW 30.

The procedure for moving a flow performed by the UE 10 in S912 illustrated in FIG. 7 will be described with reference to FIG. 13. First, the UE 10 transmits an IP flow mobility trigger to the ePDG 65 and requests switching of the access system used for communicating the flow (S1302).

The UE 10 transmits the IP flow mobility trigger while including identification information regarding the flow for which the switching is requested and identification information regarding the access system set as a result of the switching in the IP flow mobility trigger on the basis of the UE policy.

Upon receiving the IP flow mobility trigger from the UE 10, the ePDG 65 transmits proxy binding update to the PGW 30 to transmit a request to switch the access system used for communicating the flow of the UE 10 (S1304). The ePDG 65 transmits the proxy binding update while including the identification information regarding the flow for which the switching is requested and the identification information regarding the access system set as a result of the switching in the proxy binding update.

Upon receiving the proxy binding update, the PGW 30 begins the procedure for changing the IP-CAN session (S1306). First, the PGW 30 transmits a request to change the IP-CAN session to the PCRF 60. At this time, the PGW 30 provides an updated routing rule for the PCRF 60. That is, a database is updated such that Flow 2 for which the communication of data through LTE (through the PGW 30, the SGW 35, and the eNB 45) is being performed is switched to the communication of data through WLAN (the PGW 30, the ePDG 65, and the WLAN ANb 75). Here, the PGW 30 manages the flow by checking the source IP address, the destination IP address, the source port number, the destination port number, and the protocol number of packets so that transmission and reception of data to and from an appropriate access system can be performed.

Next, a procedure for changing the GW control session is performed (S1308). That is, the PGW 30 changes, for Flow 2, the communication of data through LTE (through the PGW 30, the SGW 35, and the eNB 45) to the communication of data through WLAN (the PGW 30, the ePDG 65, and the WLAN ANb 75).

Next, the PGW 30 confirms completion of the update of the binding, the change of the IP-CAN session, and the procedure for changing the GW control session, and transmits a proxy binding response to the WLAN ANb 75 to permit the request from the UE 10 (S1310). Upon receiving the proxy binding response, the WLAN ANb 75 transmits an IP flow mobility ack to the UE 10 to permit the request from the UE 10 (S1312).

On the other hand, the PCRF 60 performs the procedure for changing the GW control session (S1314). That is, the PCRF 60 ends the communication of Flow 2 through LTE.

It is to be noted that transmission and reception performed by the WLAN ANb 75 refers to transmission and reception performed by the UE 10 to and from an apparatus (for example, the WLAN APb 76) included in the WLAN ANb 75.

As a result of the above procedure, the UE 10 and the PGW 30 switch the communication path from one through LTE (through the PGW 30, the SGW 35, and the eNB 45) to one through the WLAN ANb 75 (the PGW 30, the ePDG 65, and the WLAN ANb 75), and continue the communication of Flow 2.

1.3.5 Fifth Example

Next, a fifth example will be described. In the fifth example, not the procedure illustrated in FIG. 10 or the procedure illustrated in FIG. 13 but a procedure illustrated in FIG. 14 is used in S912 illustrated in FIG. 7.

Figure 10:
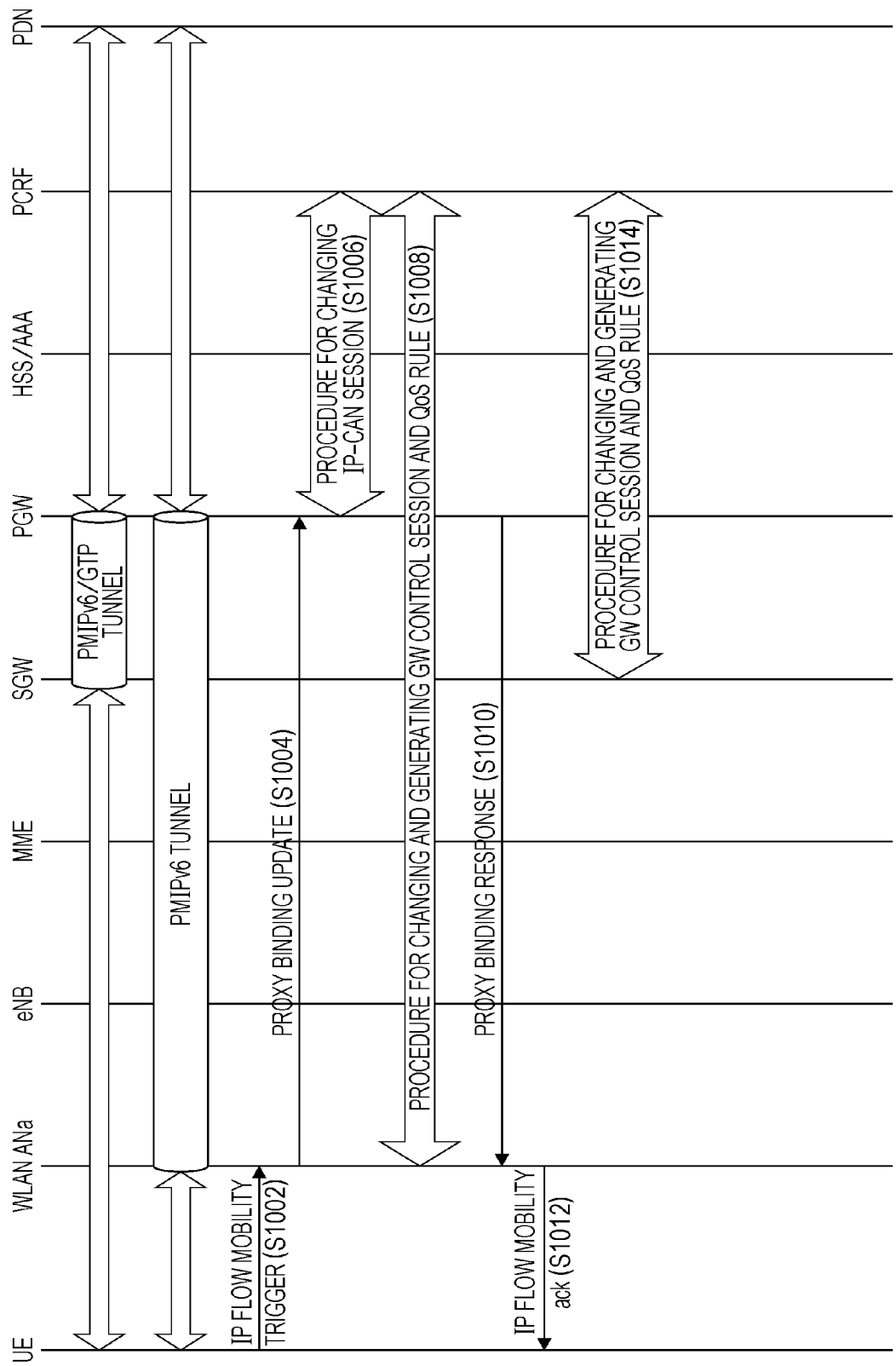
FIG. 10 is a diagram for explaining switching of an access system according to the first embodiment (first example).
Figure 14:
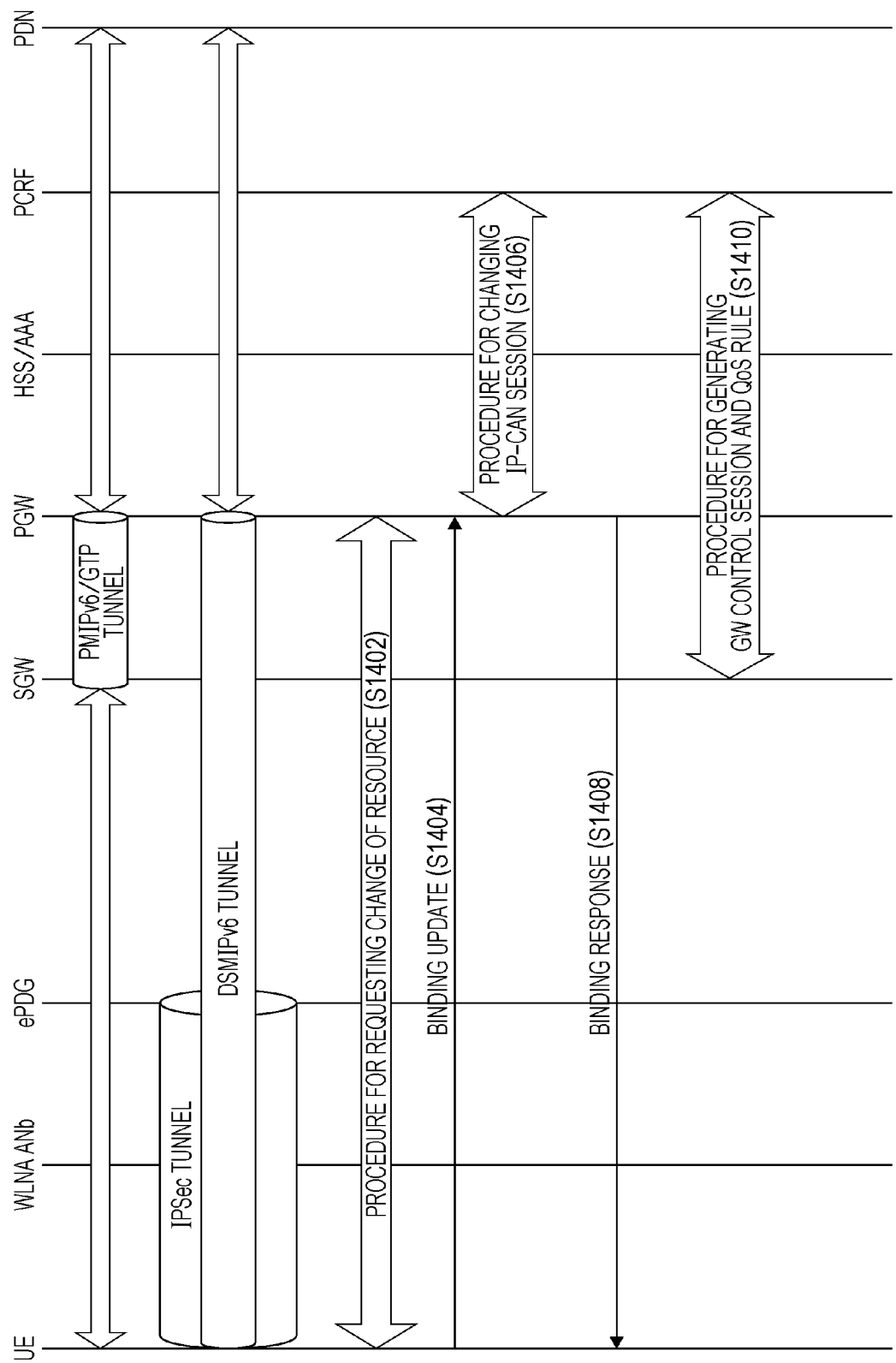
FIG. 14 is a diagram for explaining the switching of the access system according to the first embodiment (fifth example).

A difference between the procedures illustrated in FIGS. 10 and 13 and the procedure illustrated in FIG. 14 is that the binding update is transmitted from the UE 10. Whereas the binding update is transmitted by the WLAN ANa 70 and the ePDG 65 in the procedure illustrated in FIG. 10 and the procedure illustrated in FIG. 13, respectively, the UE 10 becomes capable of transmitting the binding update to the PGW 30 by using the function of a mobile IP in the procedure illustrated in FIG. 14.

It is to be noted that, as in the fourth example, when the UE 10 is connected to a plurality of access networks of the WLAN access system, the UE 10 may hold a policy for selecting an access network in advance and select an access network on the basis of the policy, or may arbitrarily select an access network. When the number of access networks of the WLAN access system to which the UE 10 is connected is one, the UE 10 selects the access network. In the following example, an example will be described in which the UE 10 selects the WLAN ANb 75 as the access network and performs the procedure for switching the access system.

In the following description, the WLAN to be connected is the WLAN ANb 75 (through the WLAN ANb 75, the ePDG 65, and the PGW 30), but the same procedure may be used in the case of the WLAN ANa 70 (through the WLAN ANa 70 and the PGW 30).

The procedure for moving the flow performed by the UE 10 in 912 illustrated in FIG. 7 will be described with reference to FIG. 14. First, the UE 10 performs a procedure for requesting a change of a resource made by the UE 10 (S1402). Here, before the switching from LTE to the WLAN ANb 75 (through the WLAN ANb 75, the ePDG 65, and the PGW 30), a resource necessary to switch to the WLAN ANb 75 (through the WLAN ANb 75, the ePDG 65, and the PGW 30) is assigned.

Next, the UE 10 transmits binding update to the PGW 30 to request switching of the system used for communicating the flow (S1404). At this time, the UE 10 transmits the binding update while including identification information regarding the flow for which the switching is requested and identification information regarding the access system set as a result of the switching in the binding update on the basis of the UE policy.

Upon receiving the proxy binding update, the PGW 30 begins the procedure for changing the IP-CAN session (S1406). First, the PGW 30 transmits a request to change the IP-CAN session to the PCRF 60. At this time, the PGW 30 provides an updated routing rule for the PCRF 60. That is, a database is updated such that Flow 2 for which the communication of data through LTE (through the PGW 30, the SGW 35, and the eNB 45) is being performed is switched to the communication of data through WLAN (the PGW 30 and the WLAN ANa 70).

Here, the PGW 30 manages the identification information regarding the flow and a communication path used by the flow while associating the identification information and the communication path with each other as a binding. The identification information regarding the flow is the source IP address, the destination IP address, the source port number, the destination port number, or the protocol number of packets or the like. The communication path may be managed by identifying the communication path with its access system or may be managed by adding identification information to each communication path through each access system. In doing so, data can be transmitted and received by selecting a communication path for each flow.

Next, the PGW 30 confirms completion of the update of the binding and the procedure for changing the IP-CAN session, and transmits a binding response to the UE 10 to permit the request from the UE 10 (S1408).

On the other hand, the PCRF 60 performs a procedure for changing the GW control session and generating a QoS rule (S1410). That is, the communication of Flow 2 through LTE (through the PGW 30, the SGW 35, and the eNB 45) ends. At this time, the QoS of the communication of Flow 2 through LTE (through the PGW 30, the SGW 35, and the eNB 45) is changed.

As a result of the above procedure, the UE 10 that has received the MO policy 242 (the flow (Flow 2), the degree of compulsion (shall, should, or may), and the access system (WLAN)) determined for each flow from the ANDSF 20 as the response of the access system information while transmitting and receiving data through LTE or WLAN for each flow becomes capable of changing, for Flow 2, the transmission and reception of data using the communication path through LTE (through the PGW 30, the SGW 35, and the eNB 45) to the transmission and reception of data using the communication path through WLAN (the WLANa and the PGW 30) by changing the MO policy 242 as the UE policy 142.

It is to be noted that the access network transmitted using the MO policy 242 is not limited to the WLAN ANb 75, and the WLAN ANa 70 may be used in accordance with the policy of the MO, instead. When a policy for switching to the WLAN ANa 70 has been received, the UE 10 becomes capable of changing, for Flow 2, the transmission and reception of data through LTE (through the PGW 30, the SGW 35, and the eNB 45) to the transmission and reception of data through the WLAN ANa 70 (through the WLAN ANa and the PGW 30) using the same procedure. More specifically, the UE 10 transmits the binding update to the PGW 30 through the WLAN ANb 75 to switch the access system.

2. Second Embodiment

2.1 Configurations

A second embodiment will be described. A mobile communication system according to the second embodiment may use the same configuration as that used in the first embodiment. In addition, the components (apparatuses) of the IP mobile communication network 5 may also be used in the same manner, and accordingly description thereof is omitted.

It is to be noted that the configuration of the UE 10 illustrated in FIG. 2 may be used in this embodiment. However, it is assumed that the UE policy 142 uses a configuration illustrated in FIG. 15. In FIG. 15(*a*), each APN (APN identifier) (for example, "APN 1") and an access system (for example, "LTE") are associated with each other and stored, and the UE 10 manages the access system applied to each APN. Here, the APN refers to a connection destination at a time when a network service or an Internet connection is provided, and a different identifier is given for each service. Therefore, by connecting to an access system using an APN, a service associated with the APN can be used.

The Internet is a specific example of the APN. In addition, the access system need not be LTE, but may be WLAN or WiMAX, instead.

In addition, the configuration of the ANDSF 20 illustrated in FIG. 4 may be used. However, it is assumed that the MO policy 242 uses a configuration illustrated in FIG. 16. In FIG. 16, a degree of compulsion (for example, "shall") is set for each APN (APN identifier) (for example, "APN 2"), and an access system (for example, "WLAN") is determined for each APN (for example, "APN 2").

Although the ANDSF 20 manages an access system for each flow and transmits a change of the access system for each flow and the UE 10 manages an access system for each flow and changes the access system for each flow in the first embodiment, the ANDSF 20 is capable of managing an access system for each APN and transmitting a change of the access system for each APN and the UE 10 is capable of managing an access system for each APN and changing the access system for each APN in the second embodiment.

2.2 Examples

2.2.1 First Example

A first example in which the above-described configuration is used will be described with reference to FIG. 7. First, a procedure for switching, for Flow 2, from transmission and reception of data using a communication path through the access system LTE (through the eNB 45, the SGW 35, and the PGW 30) to transmission and reception of data using a communication path through WLAN (through the WLAN ANa 70 and the PGW 30) by transmitting, as the MO policy 242 illustrated in FIG. 16, the degree of compulsion shall and the access system WLAN from the ANDSF 20 to the UE 10 in communication performed by connecting to APN 2 and causing the UE policy 142 to reflect the MO policy 242 as in FIG. 15(b) in a state in which the UE 10 is connected to the base station apparatus (eNB 45) of the LTE AN 80 and the apparatuses (the WLAN APa 72 and/or the GW 74) of the WLAN ANa 70 and in a state in which, in accordance with the UE policy before the change illustrated in FIG. 15(a), communication performed by connecting to APN 1 is performed using a communication path through LTE (through the eNB 45, the SGW 35, and the PGW 30), the communication performed by connecting to APN 2 is performed using a communication path through LTE (through the eNB 45, the SGW 35, and the PGW 30), and communication performed by connecting to APN 3 is performed using a communication path through WLAN (through the WLAN ANa 70 and the PGW 30) will be described. It is to be noted that each communication path can be identified with its access system, and the UE 10, the PGW 30, and the ANDSF 20 perform the procedure using the access systems as identification information regarding the communication paths.

It is to be noted that the same procedure as that in the first example of the first embodiment may be used in S902 to S906 illustrated in FIG. 7, and accordingly description thereof is omitted.

The ANDSF 20 transmits a response of access system information to the UE 10 (S908). A configuration included in the response of the access system information transmitted by the ANDSF 20 at this time is illustrated in FIG. 17. In FIG. 17, an APN identifier (for example, "APN 2"), a degree of compulsion (for example, "shall"), and an access system (for example, "WLAN") are transmitted to the UE 10.

Upon receiving the response of the access system information from the ANDSF 20, the UE 10 checks information regarding the APN identifier (APN 2), the degree of compulsion (shall), and the access system (WLAN) included in the response of the access system information, and applies the MO policy 242 to the UE policy 142. That is, the UE 10 changes the access system LTE for APN 2 in the UE policy to WLAN. After changing the UE policy 142, the UE 10 determines the procedure for changing the access system to change the access system for APN 2 (S910).

Next, the UE 10 executes switching of the access system. A specific procedure for switching the access system will be described with reference to FIG. 18.

It is to be noted that when the UE 10 is connected to a plurality of access networks of the WLAN access system, the UE 10 may hold a policy for selecting an access network in advance and select an access network on the basis of the policy, or may arbitrarily select an access network. When the number of access networks of the WLAN access system to which the UE 10 is connected is one, the UE 10 selects the access network. In the following example, an example will be described in which the UE 10 selects the WLAN ANa 70 as the access network and performs the procedure for switching the access system.

First, the procedure for switching the access system begins when the UE 10 has transmitted an L3 attach trigger to the WLAN ANa 70 to request the WLAN ANa 70 to switch the access system used for communication using an APN (S1702). At this time, the UE 10 transmits the L3 attach trigger while including an APN identifier (APN 2) of an APN for which the access system is to be switched and an access system set as a result of the switching or identification information regarding the access system in the L3 attach trigger.

Next, the WLAN ANa 70 transmits proxy binding update to the PGW 30 to transmit a request to switch the access system used for the communication performed by the UE 10 using an APN (S1704). At this time, the WLAN ANa 70 notifies the PGW 30 that, for APN 2, transmission and reception of data through LTE (through the PGW 30, the SGW 35, and the eNB 45) are to be switched to transmission and reception of data through WLAN (the PGW 30 and the WLAN ANa 70). The WLAN ANa 70 transmits the proxy binding update while including the APN identifier (APN 2) regarding the APN for which the access system is to be switched and the access system set as a result of the switching or the identification information regarding the access system in the proxy binding update.

Upon receiving the proxy binding update, the PGW 30 begins the procedure for changing the IP-CAN session (S1706). More specifically, the PGW 30 transmits a request to change the IP-CAN session to the PCRF 60. At this time, the PGW 30 provides an update routing rule for the PCRF 60. That is, the database is updated such that APN 2 with which the transmission and reception of data through LTE (through the PGW 30, the SGW 35, and the eNB 45) is being performed is switched to the transmission and reception of data through WLAN (the PGW 30 and the WLAN ANa 70). Here, the PGW 30 manages APN identifiers such that data can be transmitted and received to and from an appropriate access system by checking an APN identifier.

Next, the PGW 30 updates a PGW address and transmits the PGW address to the HSS (S1708). Here, the PGW 30 also includes APN 2 transmitted from the WLAN ANa 70 in addition to the PGW address.

Next, the PGW 30 confirms completion of the update of the binding and the procedure for changing the IP-CAN session, and transmits a proxy binding response to the WLAN ANa 70 to permit the request from the UE 10 (S1710).

Next, the procedure for changing the GW control session and the QoS rule is performed (S1712). That is, the PGW 30 changes, for APN 2, the transmission and reception of data through LTE (through the PGW 30, the SGW 35, and the eNB 45) to the transmission and reception of data through the WLAN ANa 70 (the PGW 30 and the WLAN ANa 70). At this time, the QoS of the transmission and reception of data through the WLAN ANa 70 (the PGW 30 and the WLAN ANa 70) with APN 2 is changed.

Upon receiving the proxy binding response, the WLAN ANa 70 transmits an L3 attach completion notification to the UE 10 to permit the request from the UE 10 (S1714).

On the other hand, the PGW 30 releases an LTE resource corresponding to APN 2 (S1716). That is, the PGW 30 ends the transmission and reception of data through LTE with APN 2.

As a result of the above procedure, the UE 10 and the PGW 30 switch the communication path from one through LTE (through the PGW 30, the SGW 35, and the eNB 45) to one through the WLAN ANa 70 (the PGW 30 and the WLAN ANa 70) and continue communication of a service provided from APN 2.

As described above, for APN 2, the transmission and reception of data through LTE (through the PGW 30, the SGW 35, and the eNB 45) can be switched to the transmission and reception of data through WLAN (the WLAN ANa 70 and the PGW 30) by transmitting the degree of compulsion "shall" and the access system WLAN from the ANDSF 20 to the UE 10 for APN 2.

In other words, the MO can cause the UE 10 to perform switching according to the MO policy by transmitting, to the UE 10, a switching instruction that compels the UE 10 to perform the switching.

2.2.2 Second Example

Next, a second example will be described. In the second example, not the configuration illustrated in FIG. 17 but a configuration illustrated in FIG. 19 is included in the response of the access system information transmitted from the ANDSF 20 to the UE 10 in S908 illustrated in FIG. 7. In the configuration illustrated in FIG. 19, not the degree of compulsion "shall" but a degree of compulsion "should" is used. The degree of compulsion "should" indicates a desire of the MO, which means that the UE 10 need not necessarily cause the UE policy 142 to reflect the MO policy 242.

That is, upon receiving the degree of compulsion "should" as the response of the access system information in S908 illustrated in FIG. 7, the UE 10 selects whether or not to cause the UE policy 142 to reflect the MO policy 242. If the MO policy 242 is to be changed as the UE policy 142, the MO policy 242 is changed to the UE policy after the change illustrated in FIG. 15(b). A shifting procedure when the UE 10 that has changed the UE policy 142 has changed is as described in the first embodiment, that is, the processing in S910 and S912 illustrated in FIG. 7 is executed. Thereafter, the same switching procedure as that in the first example is performed.

As a result of the above procedure, the UE 10 and the PGW 30 switch the communication path from one through LTE (through the PGW 30, the SGW 35, and the eNB 45) to one through the WLAN ANa 70 (the PGW 30 and the WLAN ANa 70), and continue the communication of the service provided from APN 2.

On the other hand, if the UE 10 does not change the MO policy 242 as the UE policy 142, the UE policy before the change illustrated in FIG. 15(a) is not changed. If the UE 10 does not change the UE policy 142, the procedure ends.

2.2.3 Third Example

Next, a third example will be described. In the third example, the ANDSF 20 does not use the configuration illustrated in FIG. 17 or the configuration illustrated in FIG. 19 but uses a configuration illustrated in FIG. 20 for the response of the access system information transmitted to the UE 10 (S908). A difference between the configurations illustrated in FIGS. 17 and 19 and the configuration illustrated in FIG. 20 is that not the degree of compulsion "shall" or the degree of compulsion "should" but a degree of compulsion "may" is used. The degree of compulsion "may" indicates that the degree of compulsion set by the MO is low and the UE 10 may arbitrarily determine whether or not to use the MO policy 242.

That is, upon receiving the degree of compulsion "may" as the response of the access system information in S908 illustrated in FIG. 7, the UE 10 selects whether or not to cause the UE policy 142 to reflect the MO policy 242. If the MO policy 242 is to be changed as the UE policy 142, the MO policy 242 is changed to the UE policy after the change illustrated in FIG. 15(b). A shifting procedure when the UE 10 that has changed the UE policy 142 has changed is as described above, that is, the processing in S910 and S912 illustrated in FIG. 7 is executed. Thereafter, the same switching procedure as that in the first example is performed.

As a result of the above procedure, the UE 10 and the PGW 30 switch the communication path from one through LTE (through the PGW 30, the SGW 35, and the eNB 45) to one through the WLAN ANa 70 (the PGW 30 and the WLAN ANa 70), and continue the communication of the service provided from APN 2.

On the other hand, if the UE 10 does not change the MO policy 242 as the UE policy 142, the UE policy before the change illustrated in FIG. 15(a) is not changed. If the UE 10 does not change the UE policy 142, the procedure ends.

2.2.4 Fourth Example

Next, a fourth example will be described. In the fourth example, not the procedure illustrated in FIG. 18 but a procedure illustrated in FIG. 21 is used in S912 illustrated in FIG. 7.

Figure 18:
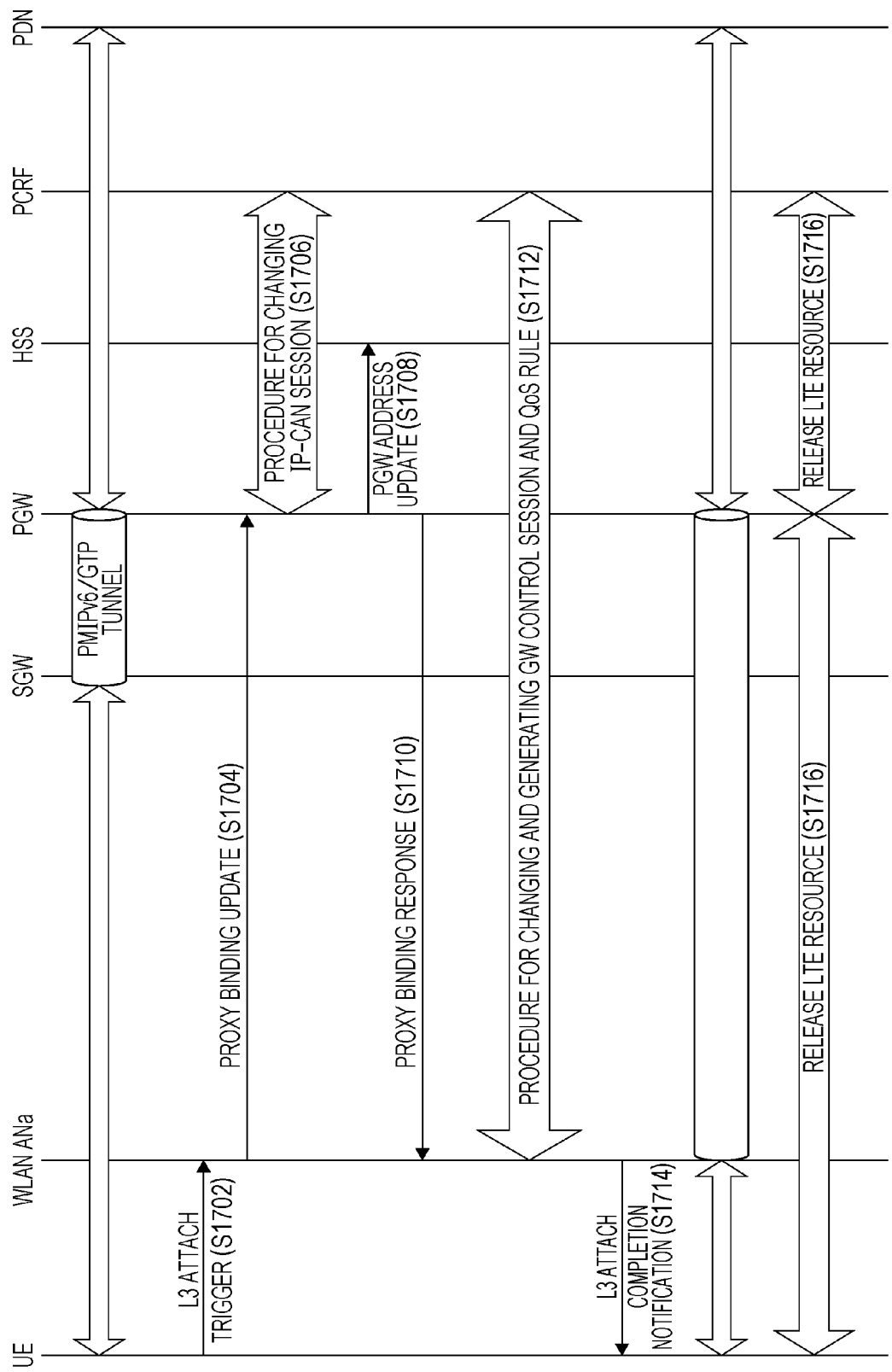
FIG. 18 is a diagram for explaining switching of an access system according to the second embodiment (first example).
Figure 21:
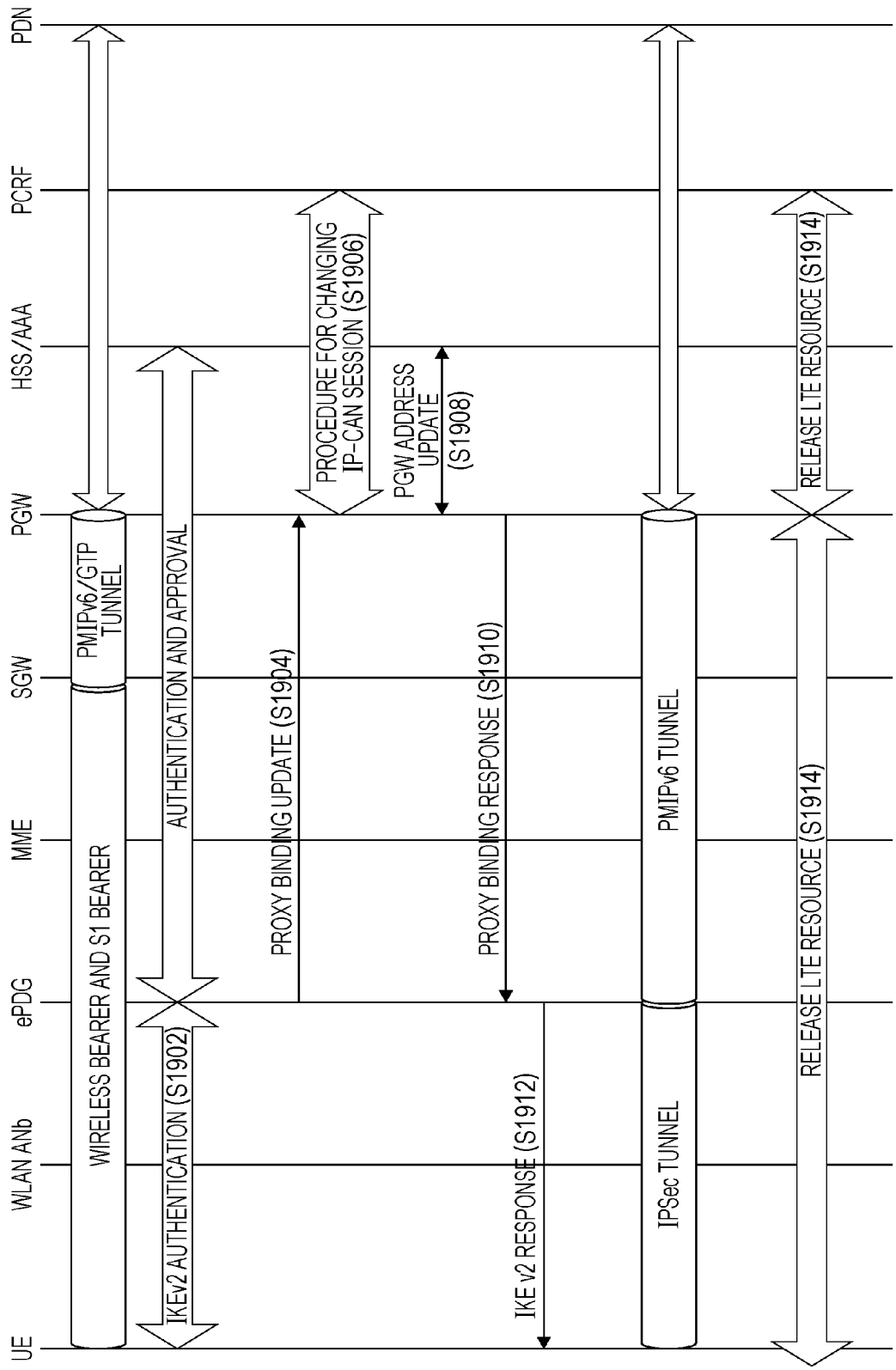
FIG. 21 is a diagram for explaining the switching of the access system according to the second embodiment (fourth embodiment).

A difference between the procedure illustrated in FIG. 18 and the procedure illustrated in FIG. 21 is that an access network to be connected is different. Whereas the WLAN ANa 70 is connected in the procedure illustrated in FIG. 18, the WLAN ANb 75 is connected in the procedure illustrated in FIG. 21. That is, the UE 10 switches from communication through LTE (through the PGW 30, the SGW 35, and the eNB 45) to not communication through WLAN through the WLAN ANa 70 and the PGW 30 but communication through WLAN through the WLAN ANb 75, the ePDG 65, and the PGW 30.

As described in the first example, when the UE 10 is connected to a plurality of access networks of the WLAN access system, the UE 10 may hold a policy for selecting an access network in advance and select an access network on the basis of the policy, or may arbitrarily select an access network. When the number of access networks of the WLAN access system to which the UE 10 is connected is one, the UE 10 selects the access network. In the following example, an example will be described in which the UE 10 selects the WLAN ANb 75 as the access network and performs the procedure for switching the access system.

The procedure for switching the access system performed by the UE 10 in S912 illustrated in FIG. 7 will be described with reference to FIG. 21. First, the UE 10 performs IKEv2 authentication (S1902). Here, the ePDG 65 performs authentication and approval for use of APN 2 for the HSS/AAA servers, and the ePDG 65 is notified that a procedure for switching to the WLAN ANb 75 is to begin for APN 2.

Upon receiving the ePDG 65 that has completed the IKEv2 authentication with the UE 10, the ePDG 65 transmits proxy binding update to the PGW 30 (S1904). At this time, the ePDG 65 notifies, using the proxy binding update, the PGW 30 that the switching to the WLAN ANb 75 is to be performed for APN 2.

Upon receiving the proxy binding update, the PGW 30 begins the procedure for changing the IP-CAN session (S1906). First, the PGW 30 transmits a request to change the IP-CAN session to the PCRF 60. At this time, the PGW 30 provides an updated routing rule for the PCRF 60. That is, the database is updated such that, for APN 2, the communication of data through LTE (through the PGW 30, the SGW 35, and the eNB 45) is switched to the communication of data through WLAN (the PGW 30 and the WLAN ANa 70). Here, the PGW 30 manages APNs such that data can be transmitted and received to and from an appropriate access system for each APN.

Next, the PGW 30 updates a PGW address (S1908). Here, the PGW 30 also includes APN 2 transmitted from the WLAN ANa 70 in addition to the PGW address.

Next, the PGW 30 confirms completion of the update of the binding and the procedure for changing the IP-CAN session, and transmits a proxy binding response to the WLAN ANb 75 (S1910). Upon receiving the proxy binding response, the ePDG 65 transmits an IKEv2 response (S1912). By receiving the IKEv2 response, the UE 10 becomes able to transmit and receive data through WLAN (the WLAN ANb 75, the ePDG 65, and the PGW 30) with APN 2.

As a result of the above procedure, the UE 10 and the PGW 30 switch the communication path from one through LTE (through the PGW 30, the SGW 35, and the eNB 45) to one through the WLAN ANb 75 (the PGW 30, the ePDG 65, and the WLAN ANb 75), and continue the communication of the service provided from APN 2.

On the other hand, the PGW 30 releases an LTE resource corresponding to APN 2 (S1914). That is, the PGW 30 ends the transmission and reception of data through LTE with APN 2.

2.2.5 Fifth Example

Next, a fifth example will be described. In the fifth example, not the procedure illustrated in FIG. 18 or the procedure illustrated in FIG. 21 but a procedure illustrated in FIG. 22 is used in S912 illustrated in FIG. 7.

Figure 22:
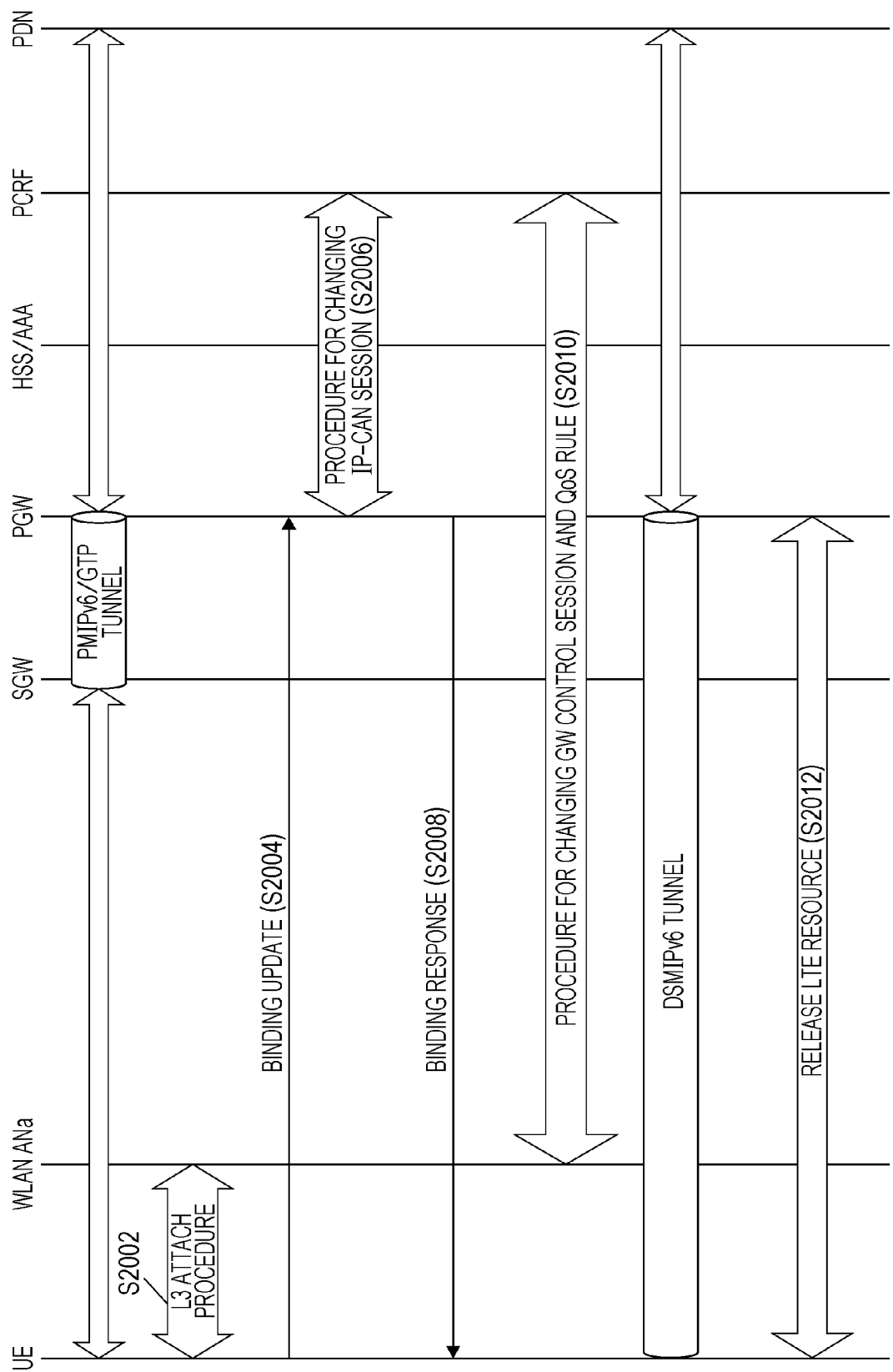
FIG. 22 is a diagram for explaining the switching of the access system according to the second embodiment (fifth embodiment).

A difference between the procedures illustrated in FIGS. 18 and 21 and the procedure illustrated in FIG. 22 is that binding update is transmitted from the UE 10. Although the WLAN ANa 70 and the ePDG 65 transmit the binding update in the procedure illustrated in FIG. 18 and the procedure illustrated in FIG. 21, respectively, the UE 10 is capable of transmitting the binding update to the PGW 30 using the function of a mobile IP in the procedure illustrated in FIG. 22.

It is to be noted that, as in the fourth example, when the UE 10 is connected to a plurality of access networks of the WLAN access system, the UE 10 may hold a policy for selecting an access network in advance and select an access network on the basis of the policy, or may arbitrarily select an access network. When the number of access networks of the WLAN access system to which the UE 10 is connected is one, the UE 10 selects the access network. In the following example, an example will be described in which the UE 10 selects the WLAN ANa 70 as the access network and performs the procedure for switching the access system.

The procedure for switching the access system performed by the UE 10 in S912 illustrated in FIG. 7 will be described with reference to FIG. 22. First, the UE 10 performs an L3 attach procedure (S2002). In this procedure, before the access system is switched from one through LTE to one through the WLAN ANa 70 (the UE 10, the WLAN ANa 70, and the PGW 30), the IP address of the UE 10 is obtained and resources necessary to transmit and receive data to and from the WLAN ANa 70 are secured in order to switch to the access system through the WLAN ANa 70 (the UE 10, the WLAN ANa 70, and the PGW 30).

Next, the UE 10 transmits the binding update to the PGW 30 (S2004). At this time, the UE 10 notifies the PGW 30 that, for APN 2, the transmission and reception of data through LTE is to be switched to the transmission and reception of data through the WLAN ANa 70.

Upon receiving the proxy binding update, the PGW 30 begins the procedure for changing the IP-CAN session (S2006). First, the PGW 30 transmits a request to change the IP-CAN session to the PCRF 60. At this time, the PGW 30 provides an updated routing rule for the PCRF 60. That is, the database is updated such that, for APN 2, the transmission and reception of data through LTE (through the PGW 30, the SGW 35, and the eNB 45) are switched to the transmission and reception of data through WLAN (the PGW 30 and the WLAN ANa 70). Here, the PGW 30 manages an access system for each APN.

Next, the PGW 30 confirms completion of the update of the binding and the procedure for changing the IP-CAN session, and transmits a binding response to the UE 10 (S2008).

On the other hand, the PCRF 60 performs a procedure for changing the GW control session and generating the QoS rule (S2010). That is, the PCRF 60 begins the transmission and reception of data through WLAN (through the PGW 30, the SGW 35, and the eNB 45) with APN 2. Here, the QoS of the transmission and reception of data through WLAN (the PGW 30, the WLAN ANa 70, and the UE 10) is changed.

On the other hand, the PGW 30 releases an LTE resource (S2012). The transmission and reception of data through LTE (through the PGW 30, the SGW 35, and the eNB 45) with APN 2 ends.

As a result of the above procedure, the UE 10 that has received the MO policy 242 (the APN identifier (APN 2), the degree of compulsion (shall, should, or may), and the access system (WLAN)) determined for each APN from the ANDSF 20 as the response of the access system information while transmitting and receiving data through LTE or WLAN with each APN becomes capable of changing, for APN 2, the transmission and reception of data using the communication path through LTE (through the PGW 30, the SGW 35, and the eNB 45) to the transmission and reception of data using the communication path through WLAN (the WLAN ANa 70 and the PGW 30) by changing the MO policy 242 as the UE policy 142.

It is to be noted that the access network transmitted using the MO policy 242 is not limited to the WLAN ANa 70, and the WLAN ANb 75 may be used in accordance with the policy of the MO, instead. When a policy for switching to the WLAN ANb 75 has been received, the UE 10 becomes capable of changing, in the transmission and reception of data performed by connecting to APN 2, the transmission and reception of data through LTE (through the PGW 30, the SGW 35, and the eNB 45) to the transmission and reception of data through the WLAN ANa 70 (the WLAN ANb 75 and the PGW 30) using the procedure described with reference to FIG. 14.

3. Third Embodiment

3.1 Configurations

Next, a third embodiment will be described. A mobile communication system according to the third embodiment may use the same configuration as that used in the first embodiment and the second embodiment. In addition, the components (apparatuses) of the IP mobile communication network 5 may be used in the same manner, and accordingly description thereof is omitted.

It is to be noted that the configuration of the UE 10 illustrated in FIG. 2 may be used in this embodiment. However, it is assumed that the UE policy 142 uses a configuration illustrated in FIG. 23. In FIG. 23(*a*), each PDN connection (for example, "PDN Connection 1") and an access system (for example, "LTE") are associated with each other and stored, and the UE 10 manages the access system applied to each PDN connection. Here, the PDN connection refers to a connection destination that provides a certain service (for example, the Internet).

In addition, the configuration of the ANDSF 20 illustrated in FIG. 4 may be used. However, the MO policy 242 uses a configuration illustrated in FIG. 24. In FIG. 24, a degree of compulsion (for example, "shall") is set for each PDN connection (for example, "PDN Connection 2"), and an access system (for example, "WLAN") is determined for each PDN connection (for example, "PDN Connection 2").

In the first embodiment, the ANDSF 20 manages an access system for each flow and transmits a change of the access system for each flow and the UE 10 manages an access system for each flow and changes the access system for each flow. In addition, in the second embodiment, the ANDSF 20 manages an access system for each APN and transmits a change of the access system for each APN and the UE 10 manages an access system for each APN and changes the access system for each APN.

In the third embodiment, however, the ANDSF 20 is capable of managing an access system for each PDN connection and transmitting a change of the access system for each PDN connection and the UE 10 is capable of managing an access system for each PDN connection and changing the access system for each PDN connection.

3.2 Examples

3.2.1 First Example

As the above-described example, the procedure of a process will be described with reference to FIG. 7. First, a procedure for switching, for Flow 2, from transmission and reception of data using a communication path through the access system LTE (through the eNB 45, the SGW 35, and the PGW 30) to transmission and reception of data using a communication path through WLAN (through the WLAN ANa 70 and the PGW 30) by transmitting, as an MO policy 242 illustrated in FIG. 25, the degree of compulsion shall and the access system WLAN from the ANDSF 20 to the UE 10 in communication performed using PDN Connection 2 and causing the UE policy 142 to reflect the MO policy 242 as in FIG. 23(*b*) in a state in which the UE 10 is connected to the base station apparatus (eNB 45) of the LTE AN 80 and the apparatuses (the WLAN APa 72 and/or the GW 74) of the WLAN ANa 70 and in a state in which, in accordance with the UE policy before the change illustrated in FIG. 23(*a*), communication performed using PDN Connection 1 is performed using a communication path through LTE (through the eNB 45, the SGW 35, and the PGW 30), the communication performed using PDN Connection 2 is performed using a communication path through LTE (through the eNB 45, the SGW 35, and the PGW 30), and communication performed using PDN Connection 3 is performed using a communication path through WLAN (through the WLAN ANa 70 and the PGW 30) will be described. It is to be noted that each communication path can be identified with its access system, and the UE 10, the PGW 30, and the ANDSF 20 perform the procedure using the access systems as identification information regarding the communication paths.

It is to be noted that the same procedure as that in the first embodiment and the second embodiment may be used in S902 to S906 illustrated in FIG. 7, and accordingly description thereof is omitted.

The ANDSF 20 transmits a response of access system information to the UE 10 (S908). A configuration included in the response of the access system information transmitted by the ANDSF 20 at this time is illustrated in FIG. 25. In FIG. 25, the PDN connection identifier (for example, "PDN Connection 2"), the degree of compulsion (for example, "shall"), and the access system (for example, "WLAN") are transmitted to the UE 10.

Upon receiving the response of the access system information from the ANDSF 20, the UE 10 checks information regarding the PDN connection identifier (PDN Connection 2), the degree of compulsion (shall), and the access system (WLAN) included in the response of the access system information, and applies the MO policy 242 to the UE policy 142. That is, the UE 10 changes the access system LTE for PDN Connection 2 in the UE policy 142 to WLAN. After changing the UE policy 142, the UE 10 determines switching (from LTE to the WLAN ANa 70) of the access system for PDN Connection 2 (S910).

It is to be noted that when the UE 10 is connected to a plurality of access networks of the WLAN access system, the UE 10 may hold a policy for selecting an access network in advance and select an access network on the basis of the policy, or may arbitrarily select an access network. When the number of access networks of the WLAN access system to which the UE 10 is connected is one, the UE 10 selects the access network. In the following example, an example will be described in which the UE 10 selects the WLAN ANa 70 as the access network and performs the procedure for switching the access system.

Next, the UE 10 executes the procedure for switching the access system at PDN Connection 2. A specific procedure for switching the access system will be described with reference to FIG. 26.

First, the procedure for switching the access system begins when the UE 10 has transmitted a PDN connection switch trigger to the WLAN ANa 70 to request the WLAN ANa 70 to switch the access system used for communication using a PDN connection (S2202). The UE 10 transmits the PDN connection switch trigger while including identification information regarding a PDN connection for which the access system is to be switched and an access system set as a result of the switching or identification information regarding the access system in the PDN connection switch trigger. Here, the PDN connection can be requested by transmitting an APN (for example, "APN 1"). In addition, different PDN connections can be requested using a single APN.

Next, the WLAN ANa 70 transmits proxy binding update to the PGW 30 and transmits a request to switch the access system used in the communication using the PDN connection (S2204). At this time, the WLAN ANa 70 notifies the PGW 30 that, as a routing policy, transmission and reception of the data through LTE (through the PGW 30, the SGW 35, and the eNB 45) are to be switched to transmission and reception of data through WLAN (the PGW 30 and the WLAN ANa 70) for PDN Connection 2. The WLAN ANa 70 transmits the proxy binding update while including the identification information regarding the PDN connection for which the access system is to be switched and the access system set as a result of the switching or the identification information regarding the access system in the proxy binding update.

Upon receiving the proxy binding update, the PGW 30 begins the procedure for changing the IP-CAN session (S2206). First, the PGW 30 transmits a request to change the IP-CAN session to the PCRF 60. At this time, the PGW 30 provides an updated routing rule for the PCRF 60. That is, the database is updated such that PDN Connection 2 at which the transmission and reception of data through LTE (through the PGW 30, the SGW 35, and the eNB 45) are being performed is switched to the transmission and reception of data through WLAN (the PGW 30 and the WLAN ANa 70). Here, the PGW 30 manages a PDN connection identifier and an access system while associating the PDN connection identifier and the access system each other.

Next, the PGW 30 updates the PGW address (S2208). Here, the PGW 30 also includes PDN Connection 2 transmitted from the WLAN ANa 70 in addition to the PGW address.

Next, the PGW 30 confirms completion of the update of the binding and the procedure for changing the IP-CAN session, and transmits a proxy binding response to the WLAN ANa 70 to permit the request from the UE 10 (S2210).

Next, the procedure for changing the GW control session and the QoS rule is performed (S2212). That is, the PGW 30 changes, for PDN Connection 2, the transmission and reception of data through LTE (through the PGW 30, the SGW 35, and the eNB 45) to the transmission and reception of data through the WLAN ANa 70 (the PGW 30 and the WLAN ANa 70). At this time, the QoS of the transmission and reception of data through the WLAN ANa 70 (the PGW 30 and the WLAN ANa 70) is changed.

Upon receiving the proxy binding response, the WLAN ANa 70 transmits a response to the PDN connection switch trigger to permit the request from the UE 10 (S2214).

On the other hand, the PGW 30 releases an LTE resource (S2216). The transmission and reception of data through LTE (through the PGW 30, the SGW 35, and the eNB 45) at PDN Connection 2 ends.

As a result of the above procedure, the UE 10 and the PGW 30 switch the communication path from one through LTE (through the PGW 30, the SGW 35, and the eNB 45) to one through the WLAN ANa 70 (the PGW 30 and the WLAN ANa 70), and continue the communication using the PDN connection.

As described above, the transmission and reception of data through LTE (through the PGW 30, the SGW 35, and the eNB 45) using a PDN connection can be switched to the transmission and reception of data through WLAN (the WLAN ANa 70 and the PGW 30) by transmitting the degree of compulsion "shall" and the access system WLAN from the ANDSF 20 to the UE 10 for the PDN connection.

In other words, the MO may cause the UE 10 to perform switching according to the MO policy by transmitting, to the UE 10, a switching instruction that compels the UE 10 to perform the switching.

3.2.2 Second Example

Next, a second example will be described. In the second example, not the configuration illustrated in FIG. 25 but a configuration illustrated in FIG. 27 is included in the response of the access system information transmitted by the ANDSF 20 to the UE 10 in S908 illustrated in FIG. 7. In the configuration illustrated in FIG. 7, not the degree of compulsion "shall" but the degree of compulsion "should" is used. The degree of compulsion "should" indicates a desire of the MO, which means that the UE 10 need not necessarily cause the UE policy 142 to reflect the MO policy 242.

That is, upon receiving the degree of compulsion "should" as the response of the access system information in S908 illustrated in FIG. 7, the UE 10 selects whether or not to cause the UE policy 142 to reflect the MO policy 242. If the MO policy 242 is to be changed as the UE policy 142, the MO policy 242 is changed to the UE policy after the change illustrated in FIG. 23(*b*). A shifting procedure when the UE 10 that has changed the UE policy 142 has changed is as described in the first embodiment, that is, the processing in S910 and S912 illustrated in FIG. 7 is executed. Thereafter, the same switching procedure as that in the first example is performed.

As a result of the above procedure, the UE 10 and the PGW 30 switch the communication path from one through LTE (through the PGW 30, the SGW 35, and the eNB 45) to one through the WLAN ANa 70 (the PGW 30 and the WLAN ANa 70), and continue the communication using the PDN connection.

On the other hand, if the UE 10 does not change the MO policy 242 as the UE policy 142, the UE policy before the change illustrated in FIG. 23(*a*) is not changed. If the UE 10 does not change the UE policy 142, the procedure ends.

3.2.3 Third Example

Next, a third example will be described. In the third example, in addition, the ANDSF 20 does not use the configuration illustrated in FIG. 25 or the configuration illustrated in FIG. 27 but uses a configuration illustrated in FIG. 28 for the response of the access system information transmitted to the UE 10 (S908). A difference between the configurations illustrated in FIGS. 25 and 27 and the configuration illustrated in FIG. 28 is that not the degree of compulsion "shall" or the degree of compulsion "should" but the degree of compulsion "may" is used. The degree of compulsion "may" indicates that the degree of compulsion set by the MO is low and the UE 10 may arbitrarily determine whether or not to use the MO policy 242.

That is, upon receiving the degree of compulsion "may" as the response of the access system information in S908 illustrated in FIG. 7, the UE 10 selects whether or not to cause the UE policy 142 to reflect the MO policy 242. If the MO policy 242 is to be changed as the UE policy 142, the MO policy 242 is changed to the UE policy after the change illustrated in FIG. 23(*b*). A shifting procedure when the UE 10 that has changed the UE policy 142 has changed is as described above, that is, the processing in S910 and S912 illustrated in FIG. 7 is executed. Thereafter, the same switching procedure as that in the first example is performed.

As a result of the above procedure, the UE 10 and the PGW 30 switch the communication path from one through LTE (through the PGW 30, the SGW 35, and the eNB 45) to one through the WLAN ANa 70 (the PGW 30 and the WLAN ANa 70), and continue the communication using the PDN connection.

On the other hand, if the UE 10 does not change the MO policy 242 as the UE policy 142, the UE policy before the change illustrated in FIG. 23(*a*) is not changed. If the UE 10 does not change the UE policy 142, the procedure ends.

3.2.4 Fourth Example

Next, a fourth example will be described. In the fourth example, not the procedure illustrated in FIG. 26 but the procedure illustrated in FIG. 21 is used in S912 illustrated in FIG. 7. A difference between the procedure illustrated in FIG. 26 and the procedure illustrated in FIG. 21 is that an access network to be connected is different.

Figure 26:
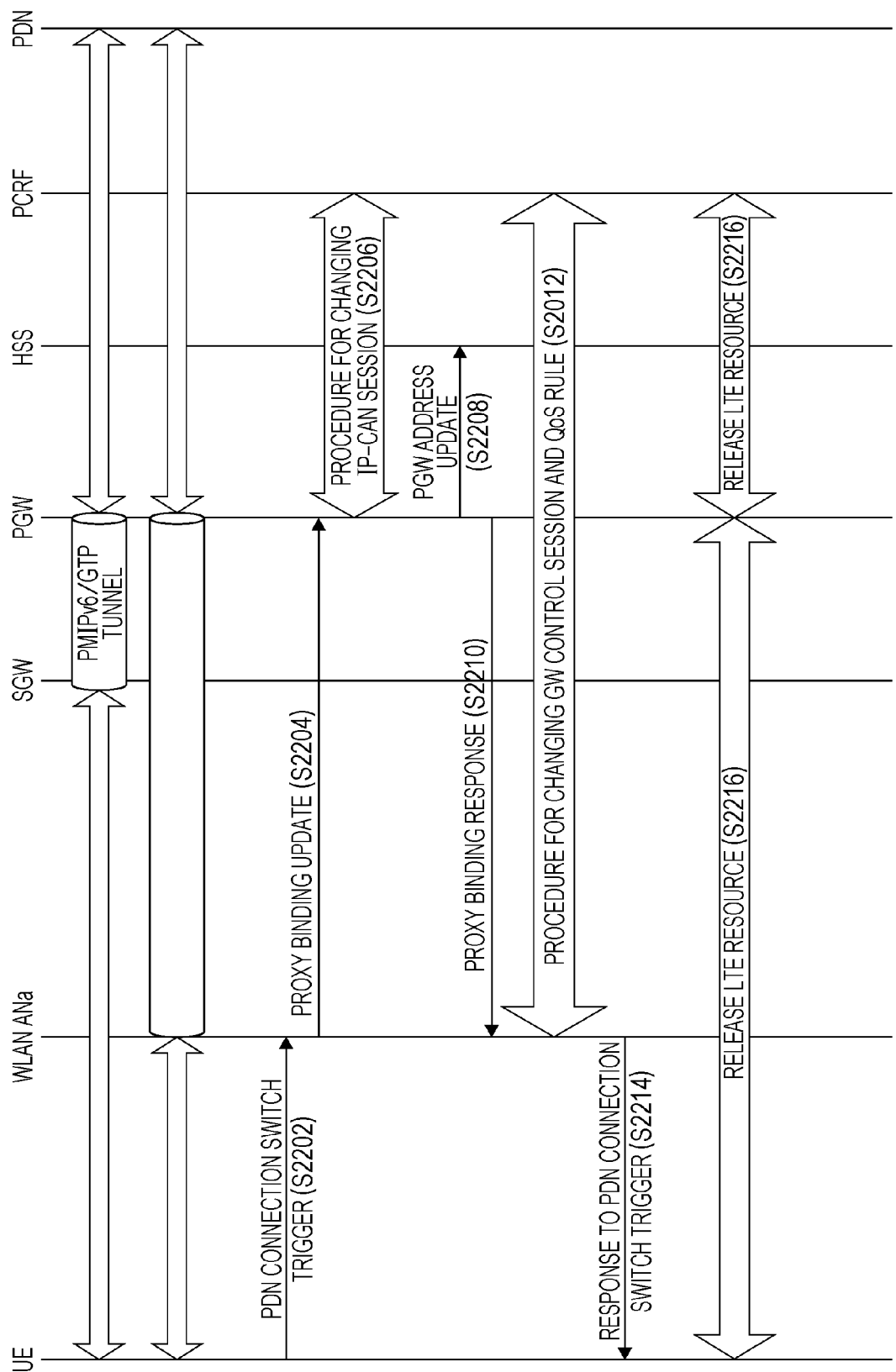
FIG. 26 is a diagram for explaining switching of an access system according to the third embodiment (first example).

Whereas the WLAN ANa 70 is connected in the procedure illustrated in FIG. 26, the WLAN ANb 75 is connected in the procedure illustrated in FIG. 21. That is, the UE 10 switches from the communication through LTE (through the PGW 30, the SGW 35, and the eNB 45) to not the communication through WLAN through the WLAN ANa 70 and the PGW 30 but the communication through WLAN through the WLAN ANb 75, the ePDG 65, and the PGW 30.

As described in the first example, when the UE 10 is connected to a plurality of access networks of the WLAN access system, the UE 10 may hold a policy for selecting an access network in advance and select an access network on the basis of the policy, or may arbitrarily select an access network. When the number of access networks of the WLAN access system to which the UE 10 is connected is one, the UE 10 selects the access network. In the following example, an example will be described in which the UE 10 selects the WLAN ANb 75 as the access network and performs the procedure for switching the access system.

The procedure for switching the access system performed by the UE 10 in S912 illustrated in FIG. 7 will be described with reference to FIG. 21. First, the UE 10 performs the IKEv2 authentication (S1902). Here, the ePDG 65 performs authentication and approval for switching of PDN Connection 2 to the WLAN ANb 75 for the HSS/AAA servers, and the ePDG 65 is notified that the procedure for switching the access system is to begin.

After completing the IKEv2 authentication with the UE 10, the ePDG 65 transmits proxy binding update to the PGW 30 (S1904). At this time, the ePDG 65 notifies, using the proxy binding update, the PGW 30 that, for PDN Connection 2, the transmission and reception of data through LTE are to be switched to the transmission and reception of data through WLAN (the PGW 30, the ePDG 65, and the WLAN ANb 75).

Upon receiving the proxy binding update, the PGW 30 begins the procedure for changing the IP-CAN session (S1906). First, the PGW 30 transmits a request to change the IP-CAN session to the PCRF 60. At this time, the PGW 30 provides an updated routing rule for the PCRF 60. That is, the database is updated such that, for PDN Connection 2, the transmission and reception of data through LTE (through the PGW 30, the SGW 35, and the eNB 45) are switched to the transmission and reception of data through WLAN (the PGW 30, the ePDG 65, and the WLAN ANb 75). Here, the PGW 30 manages PDN connections such that data can be transmitted and received to and from an appropriate access system for each PDN connection.

Next, the PGW 30 updates a PGW address (S1908). Here, the PGW 30 also includes the transmission and reception of data through the WLAN ANb 75 using PDN Connection 2 in addition to the PGW address.

Next, the PGW 30 confirms completion of the update of the binding and the procedure for changing the IP-CAN session, and transmits a proxy binding response to the WLAN ANb 75 (S1910). Upon receiving the proxy binding response, the ePDG 65 transmits an IKEv2 response (S1912).

As a result of the above procedure, the UE 10 and the PGW 30 switch the communication path from one through LTE (through the PGW 30, the SGW 35, and the eNB 45) to one through the WLAN ANb 75 (the PGW 30, the ePDG 65, and the WLAN ANb 75), and continue the communication using the PDN connection.

3.2.5 Fifth Example

Next, a fifth example will be described. In the fifth example, not the procedure illustrated in FIG. 26 or the procedure illustrated in FIG. 21 but the procedure illustrated in FIG. 22 is used in S912 illustrated in FIG. 7. A difference between the procedures illustrated in FIGS. 26 and 21 and the procedure illustrated in FIG. 22 is that binding update is transmitted from the UE 10. Although the WLAN ANa 70 and the ePDG 65 transmit the binding update in the procedure illustrated in FIG. 26 and the procedure illustrated in FIG. 21, respectively, the UE 10 is capable of transmitting the binding update to the PGW 30 using the function of a mobile IP in the procedure illustrated in FIG. 22.

It is to be noted that, as in the fourth example, when the UE 10 is connected to a plurality of access networks of the WLAN access system, the UE 10 may hold a policy for selecting an access network in advance and select an access network on the basis of the policy, or may arbitrarily select an access network. When the number of access networks of the WLAN access system to which the UE 10 is connected is one, the UE 10 selects the access network. In the following example, an example will be described in which the UE 10 selects the WLAN ANa 70 as the access network and performs the procedure for switching the access system.

The procedure for switching the access system performed by the UE 10 in S912 illustrated in FIG. 7 will be described with reference to FIG. 22. First, the UE 10 transmits the binding update to the PGW 30 (S2002). At this time, the UE 10 notifies, using the binding update, the PGW 30 that, for PDN Connection 2, transmission and reception of data through the LTE 80 are to be switched to transmission and reception of data through the WLAN ANa 70.

Upon receiving the proxy binding update, the PGW 30 begins the procedure for changing the IP-CAN session (S2004). First, the PGW 30 transmits a request to change the IP-CAN session to the PCRF 60. At this time, the PGW 30 provides an updated routing rule for the PCRF 60. That is, the database is updated such that, for PDN Connection 2, the transmission and reception of data through LTE (through the PGW 30, the SGW 35, and the eNB 45) are switched to the transmission and reception of data through WLAN (the PGW 30 and the WLAN ANa 70). Here, the PGW 30 manages an access system for each APN.

Next, the PGW 30 confirms completion of the update of the binding and the procedure for changing the IP-CAN session, and transmits a binding response to the UE 10 (S2006).

On the other hand, the PCRF 60 performs a procedure for changing the GW control session and generating a QoS rule (S2008). That is, the transmission and reception of data through WLAN (through the PGW 30, the SGW 35, and the eNB 45) at PDN Connection 2 ends. Here, the QoS of the transmission and reception of data through WLAN (the PGW 30, the WLAN ANa 70, and the UE 10) is changed.

As a result of the above procedure, the UE 10 that has received the MO policy 242 (the PDN connection identifier (APN 2), the degree of compulsion (shall, should, or may), and the access system (WLAN)) determined for each PDN connection from the ANDSF 20 as the response of the access system information while transmitting and receiving data using a communication path through LTE or WLAN for each PDN connection becomes capable of changing, for PDN Connection 2, the transmission and reception of data using the communication path through LTE (through the PGW 30, the SGW 35, and the eNB 45) to the transmission and reception of data using the communication path through WLAN (the WLAN ANa 70 and the PGW 30) by changing the MO policy 242 as the UE policy 142.

It is to be noted that the access network transmitted using the MO policy 242 is not limited to the WLAN ANa 70, and the WLAN ANb 75 may be used in accordance with the policy of the MO, instead. When a policy for switching to the WLAN ANb 75 has been received, the UE 10 becomes capable of changing, for PDN Connection 2, the transmission and reception of data through LTE (through the PGW 30, the SGW 35, and the eNB 45) to the transmission and reception of data through the WLAN ANb 75 (the WLAN ANb 75 and the PGW 30) using the procedure that has already been described with reference to FIG. 14.

4. Fourth Embodiment

Next, a fourth embodiment will be described. Although it has been described that each policy uses an access system in the above-described embodiments, a case in which an access network is used will be described in this embodiment.

A mobile communication system according to the fourth embodiment may use the same configuration as that used in the above-described embodiments. In addition, the components (apparatuses) of the IP mobile communication network 5 may be used in the same manner, and accordingly description thereof is omitted.

It is to be noted that in the first to third embodiments, a communication path can be identified with its access system and the UE 10, the PGW 30, and the ANDSF 20 perform the switching procedure using an access system as identification information regarding a communication path, but in this example, a communication path is identified with its access network. Therefore, in this embodiment, a switching procedure using an access network as identification information is performed.

In addition, in this embodiment, the configuration of the UE 10 illustrated in FIG. 2 may be used. However, it is assumed that the UE policy 142 uses a configuration illustrated in FIG. 29. In FIG. 29, each flow identifier (for example, "Flow 3") and an access network (for example, "WLAN ANa 70") are associated with each other and stored, and the UE 10 manages the access network applied to each flow identifier.

In addition, the configuration of the ANDSF 20 illustrated in FIG. 4 may be used. However, it is assumed that the MO policy 242 uses a configuration illustrated in FIG. 30. In FIG. 30, a degree of compulsion (for example, "shall") is set for each flow identifier (for example, "Flow Identifier 2"), and an access network (for example, "WLAN ANa 70") is determined for each flow identifier (for example, "Flow Identifier 2").

In the first embodiment, the ANDSF 20 manages an access system for each flow and transmits a change of the access system for each flow, and the UE 10 manages an access system for each flow and changes the access system for each flow.

In the fourth embodiment, however, the ANDSF 20 is capable of managing an access network for each flow and transmitting a change in the access network for each flow, and the UE 10 is capable of managing an access network for each flow and changing the access network for each flow.

Therefore, although the UE 10 needs to select an access network when the UE 10 is connected to a plurality of access networks that use WLAN as their access systems in the first embodiment, the UE 10 can switch an access network on the basis of the UE policy 142 even when the UE 10 is connected to a plurality of access networks that use WLAN as their access systems in the fourth embodiment.

4.2 Examples

4.2.1 First Example

Figure 31:
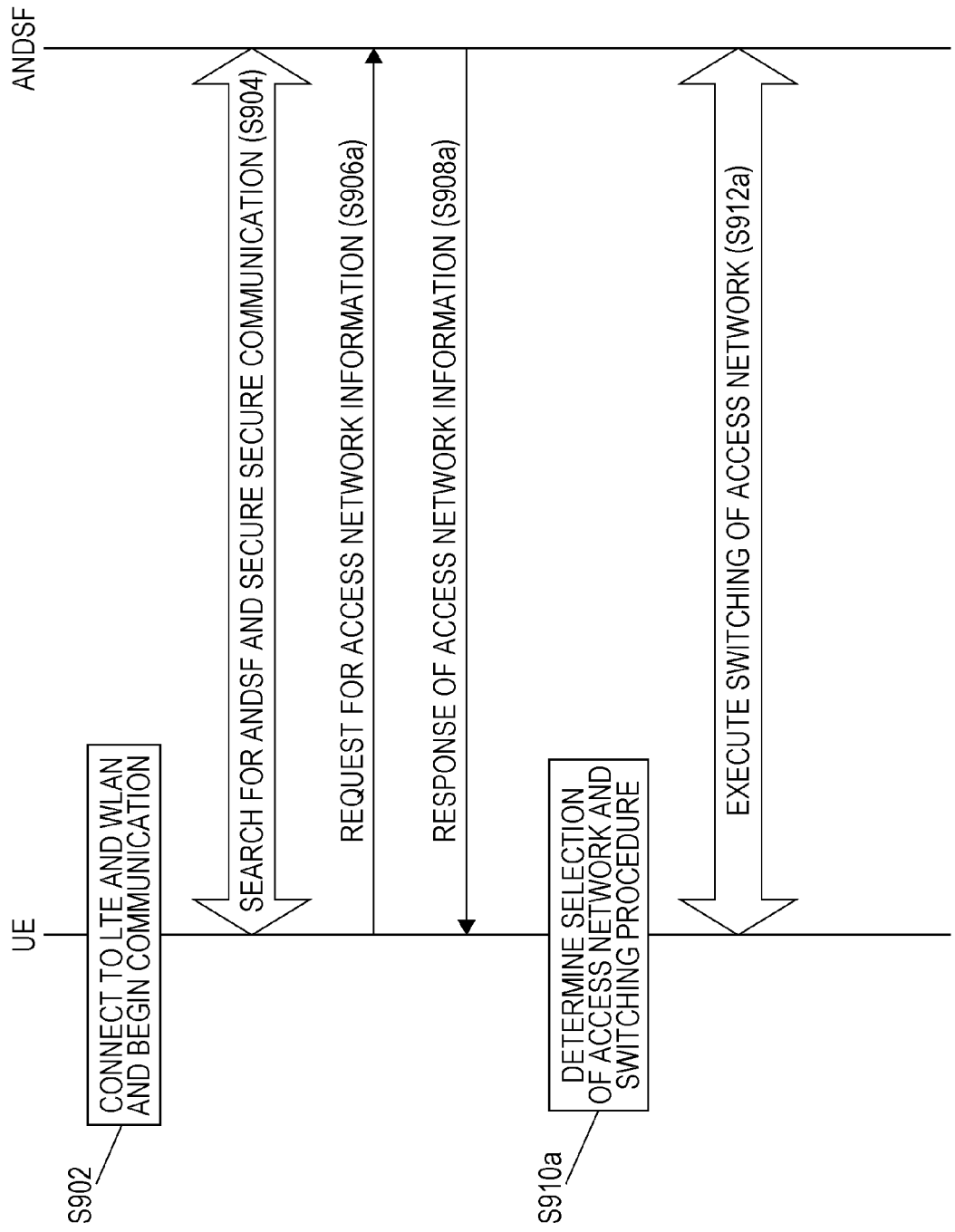
FIG. 31 is a diagram for explaining a processing flow of a UE and an ANDSF according to the fourth embodiment.

As the above-described example, the procedure of a process will be described with reference to FIG. 31. FIG. 31 illustrates a flow based on FIG. 7 for the first embodiment, and the same processing as that illustrated in FIG. 7 is given the same reference numerals and description thereof is omitted.

The UE 10 transmits a request for access network information to the ANDSF 20 (S906a). The ANDSF 20 transmits a response of the access network information on the basis of the request for access network information (S908a).

Upon receiving the response of the access network information, the UE 10 determines selection of an access network and switching of an access network used for a flow in accordance with information included in the response of the access network information (S910a). Here, since the response of the access network information includes, for Flow 2, information regarding the degree of compulsion "shall" and the access network "WLAN ANa", the access network LTE AN 80 for Flow 2 in the UE policy 142 illustrated in FIG. 29 is changed to the WLAN ANa 70. That is, the UE 10 changes the access network for Flow 2 from the LTE AN 80 to the WLAN ANa 70 and determines the access network to be connected.

It is to be noted that although an example in which the UE 10 receives the MO policy in a state in which the UE 10 is connected to the LTE AN 80 and the WLAN ANa 70 and has begun communication (S902) has been described, the UE 10 may receive the MO policy in a state in which the LTE AN 80 is connected to either the LTE AN 80 or the WLAN ANa 70, instead.

Next, the UE 10 executes the switching of the access network (S912a). The procedure for switching the access network is the same as the flow based on the FIG. 10 with reference to which the first embodiment has been described, and accordingly description of the same processing is omitted. A difference is that the identification information regarding an access system included in the transmitted and received messages is now the identification information regarding an access network.

More specifically, the information regarding an access system included in the messages such as the IP flow mobility trigger (S1002), the proxy binding update (S1004), the proxy binding response (S1010), and the IP flow mobility ack (S1012) is replaced by the information regarding an access network.

As a result, the transmission and reception of data using a communication path through the LTE AN 80 (through the PGW 30, the SGW 35, and the eNB 45) can be switched to the transmission and reception of data using a communication path through the WLAN ANa 70 (the WLAN ANa 70 and the PGW 30) for Flow 2 when the UE 10 has requested the switching of the access network and the PGW 30 has permitted the switching by transmitting the degree of compulsion "shall" and the access network WLAN ANa 70 from the ANDSF 20 to the UE 10 for Flow 2.

4.2.2 Second Example

Next, a second example will be described. In the second example, the ANDSF 20 does not use the configuration illustrated in FIG. 30 but uses a configuration illustrated in FIG. 32 for the response of the access network information transmitted to the UE 10 (S908a). Here, a difference between the configuration illustrated in FIG. 30 and the configuration illustrated in FIG. 32 is that not the degree of compulsion "shall" but the degree of compulsion "should" is used. The degree of compulsion "should" indicates a desire of the MO, which means that the UE 10 need not necessarily cause the UE policy 142 to reflect the MO policy 242.

That is, upon receiving the degree of compulsion "should" as the response of the access system information in S908a illustrated in FIG. 31, the UE 10 selects whether or not to cause the UE policy 142 to reflect the MO policy 242. If the MO policy 242 is to be changed as the UE policy 142, the UE policy illustrated in FIG. 29 is changed. A shifting procedure when the UE policy 142 has been changed is as described above, that is, the processing in S910a and S912a illustrated in FIG. 31 is executed. Thereafter, the same switching procedure as that in the first example is performed.

As a result of the above procedure, the UE 10 and the PGW 30 switch the communication path from one through LTE (through the PGW 30, the SGW 35, and the eNB 45) to one through the WLAN ANa 70 (the PGW 30 and the WLAN ANa 70), and continue the communication for the flow.

On the other hand, if the UE 10 does not change the MO policy 242 as the UE policy 142, the UE policy illustrated in FIG. 29 is not changed. If the UE 10 does not change the UE policy 142, the procedure ends.

4.2.3 Third Example

Next, a third example will be described. In the third example, the ANDSF 20 does not use the configuration illustrated in FIG. 30 or the configuration illustrated in FIG. 32 but uses a configuration illustrated in FIG. 33 for the response of the access network information transmitted to the UE 10 (S908a).

A difference between the configurations illustrated in FIGS. 30 and 32 and the configuration illustrated in FIG. 33 is that not the degree of compulsion "shall" or the degree of compulsion "should" but the degree of compulsion "may" is used. The degree of compulsion "may" indicates that the degree of compulsion set by the MO is low and the UE 10 may arbitrarily determine whether or not to use the MO policy 242.

That is, upon receiving the degree of compulsion "may" as the response of the access system information in S908a illustrated in FIG. 31, the UE 10 selects whether or not to cause the UE policy 142 to reflect the MO policy 242. If the MO policy 242 is to be changed as the UE policy 142, the UE policy illustrated in FIG. 29 is changed. A shifting procedure when the UE policy 142 has been changed is as described above, that is, the processing in S910a and S912a illustrated in FIG. 31 is executed. Thereafter, the same switching procedure as that in the first example is performed.

As a result of the above procedure, the UE 10 and the PGW 30 switch the communication path from one through LTE (through the PGW 30, the SGW 35, and the eNB 45) to one through the WLAN ANa 70 (the PGW 30 and the WLAN ANa 70), and continue the communication for the flow.

On the other hand, if the UE 10 does not change the MO policy 242 as the UE policy 142, the UE policy illustrated in FIG. 29 is not changed. If the UE 10 does not change the UE policy 142, the procedure ends.

4.2.4 Fourth Example

Next, a fourth example will be described. In the fourth example, the response of the access network (S908a) and the execution of the switching the access network (S912a) are different in the flow described with reference to FIG. 31. The other processing that is the same as that illustrated in FIG. 31 is given the same reference numerals and description thereof is omitted.

In the fourth example, information regarding the degree of compulsion "shall" and the access network "WLAN ANb 75" are included in the response S908a of the access network information illustrated in FIG. 31 for Flow 2 and transmitted. The UE 10 changes the access network LTE AN 80 for Flow 2 in the UE policy 142 illustrated in FIG. 29 to the WLAN ANb 75 in accordance with this information. That is, the UE 10 changes the access network for Flow 2 from the LTE AN 80 to the WLAN ANb 75 and determines the switching of the access network to be connected.

In the execution of the switching of the access network (S912a), not the procedure illustrated in FIG. 10 but the procedure illustrated in FIG. 13 is used for performing the switching. A difference between the procedure illustrated in FIG. 10 and the procedure illustrated in FIG. 13 is that the access network to be connected is different. Whereas the WLAN ANa 70 is connected in the procedure illustrated in FIG. 10, the WLAN ANb 75 is connected in the procedure illustrated in FIG. 13.

The procedure for switching the access network is substantially the same as the flow based on FIG. 13 with reference to which the first embodiment has been described, and accordingly description of the same processing is omitted. A difference is that the identification information regarding an access system included in the transmitted and received messages is now the identification information regarding an access network.

More specifically, the information regarding an access system included in the messages such as the IP flow mobility trigger (S1302), the proxy binding update (S1304), the proxy binding response (S1310), and the IP flow mobility ack (S1312) is replaced by the information regarding an access network.

As a result, the transmission and reception of data through the LTE AN 80 (through the PGW 30, the SGW 35, and the eNB 45) can be switched to the transmission and reception of data through the WLAN ANb 75 (the WLAN ANb 75 and the PGW 30) for Flow 2 when the UE 10 has requested the switching of the access network and the PGW 30 has permitted the switching by transmitting the degree of compulsion "shall" and the access network WLAN ANb 75 from the ANDSF 20 to the UE 10 for Flow 2.

As a result of the above procedure, the UE 10 and the PGW 30 switch the communication path from one through LTE (through the PGW 30, the SGW 35, and the eNB 45) to one through the WLAN ANb 75 (the PGW 30, the ePDG 65, and the WLAN ANb 75), and continue the communication for the flow.

4.2.5 Fifth Example

Next, a fifth example will be described. In the fifth example, not the procedure illustrated in FIG. 10 or the procedure illustrated in FIG. 13 but the procedure illustrated in FIG. 14 is used in S912a illustrated in FIG. 31.

The procedure illustrated in FIG. 14 is substantially the same as that described in the first embodiment, and accordingly detailed description thereof is omitted. A difference is that the identification information regarding an access system included in the transmitted and received messages is now the identification information regarding an access network.

More specifically, the information regarding an access system included in the messages such as the binding update (S1404) and the binding response (S1408) is replaced by the information regarding an access network.

As a result of the above procedure, the UE 10 that has received the MO policy 242 (the flow (Flow 2), the degree of compulsion (shall, should, or may), and the access network (WLAN ANa 70)) determined for each flow from the ANDSF 20 as the response of the access network information while transmitting and receiving data through LTE or WLAN for each flow becomes capable of changing, for Flow 2, the transmission and reception of data using the communication path through LTE (through the PGW 30, the SGW 35, and the eNB 45) to the transmission and reception of data using the communication path through WLAN (the WLAN ANa 70 and the PGW 30) by changing the MO policy 242 as the UE policy 142.

It is to be noted that the access network transmitted from the MO policy 242 is not limited to the WLAN ANa 70, and the WLAN ANb 75 may be used in accordance with the policy of the MO, instead. When a policy for switching to the WLAN ANb 75 has been received, the UE 10 becomes capable of changing, for Flow 2, the transmission and reception of data through LTE (through the PGW 30, the SGW 35, and the eNB 45) to the transmission and reception of data through the WLAN ANa 70 (the WLAN ANb 75 and the PGW 30) using the procedure illustrated in FIG. 22 that has already been described.

5. Modifications

Although the embodiments of the present invention have been described in detail with reference to the drawings, specific configurations are not limited to these embodiments, and designs and the like that do not deviate from the scope of the present invention are also included in the claims.

For example, a communication path in the core network established by the proxy binding update and response described in each of the embodiments may be a GTP tunnel established on the basis of a GTP protocol, instead. In this case, the proxy binding update and response messages for establishing a communication path are replaced by a request message and a response message for establishing a GTP tunnel.

In addition, a program that operates on each apparatus in the embodiments is a program (program for causing a computer to function) for controlling a CPU or the like such that the functions of the above-described embodiments are realized. In addition, information used in these apparatuses is temporarily accumulated in a temporary storage apparatus (for example, a RAM) during processing, and then stored in a storage apparatus such as one of various types of ROMs or HDDs. The information is read, corrected, or overwritten by the CPU as necessary.

Here, a recording medium that stores each program may be any of a semiconductor medium (for example, a ROM, a non-volatile memory card, or the like), an optical recording medium or a magneto-optical recording medium (for example, a DVD (Digital Versatile Disc), an MO (Magneto Optical Disc), an MD (Mini Disc), a CD (Compact Disc), a BD, or the like), a magnetic recording medium (for example, a magnetic tape, a flexible disc, or the like), and the like. In addition, not only the functions of the above-described embodiments are realized by executing loaded programs but also the functions of the present invention may be realized by performing processing in combination with an operating system, other application programs, or the like on the basis of instructions from the programs.

In addition, when the programs are to be distributed to the market, the programs may be stored in portable recording media and distributed, or the programs may be transferred to server computers connected through a network such as the Internet. In this case, needless to say, storage apparatuses of the server computers are also included in the present invention.

In addition, part or the entirety of each apparatus in the above-described embodiments may be realized as LSI (Large Scale Integration), which is typically an integrated circuit. Each function block of each apparatus may be individually realized as a chip, or part or all of the function blocks may be integrated and realized as a chip. In addition, in a method for realizing the functional blocks as an integrated circuit, not the LSI but a dedicated circuit or a general-purpose processor may be used, instead. In addition, if a technology for realizing the functional blocks as an integrated circuit that replaces the LSI is developed as a result of the evolution of semiconductor technologies, an integrated circuit realized by the technology may be used obviously.

In addition, although LTE and WLAN (for example, IEEE 802.11a/b/n or the like) have been described as examples of the wireless access network in the above-described embodiments, connections may be established using WiMAX instead of WLAN.

REFERENCE SIGNS LIST 1 mobile communication system
5 IP mobile communication network
10 UE
20 ANDSF
30 PGW
35 SGW
40 MME
45 eNB
50 HSS
55 AAA
60 PCRF
65 ePDG
70 WLAN ANa
72 WLAN APa
74 GW
75 WLAN ANb
76 WLAN APb
80 LTE AN
9 PDN

The invention claimed is:

1. UE (User Equipment) in a mobile communication system including a PGW (Packet Data Network Gateway), the UE that establishes, with the PGW, a communication path using a first access system and a communication path using a second access system, and an ANDSF (Access Network Discovery and Selection Function) that transmits a mobile operator policy to the UE, the UE comprising:
   receiving the mobile operator policy including flow identification information, access system identification information, and a degree of compulsion from the ANDSF; and
   transmitting, in a case where the degree of compulsion included in the mobile operator policy is a degree of compulsion that compels the UE to perform switching, a request to switch a communication path used for flow communication corresponding to the flow identification information to an access system corresponding to the access system identification information included in the mobile operator policy.

2. UE (User Equipment) in a mobile communication system including a PGW (Packet Data Network Gateway), the UE that establishes, with the PGW, a communication path using a first access system and a communication path using a second access system, and an ANDSF (Access Network Discovery and Selection Function) that transmits a mobile operator policy to the UE, the UE comprising:

receiving the mobile operator policy including an APN identifier, access system identification information, and a degree of compulsion from the ANDSF; and transmitting, in a case where the degree of compulsion included in the mobile operator policy is a degree of compulsion that compels the UE to perform switching, a request to switch a communication path used for an APN corresponding to the APN identifier to an access system corresponding to the access system identification information included in the mobile operator policy.

3. An ANDSF (Access Network Discovery and Selection Function) in a mobile communication system including a PGW (Packet Data Network Gateway), UE (User Equipment) that establishes, with the PGW, a communication path using a first access system and a communication path using a second access system, and the ANDSF that transmits a mobile operator policy to the UE, the ANDSF comprising:

transmitting the mobile operator policy including an APN identifier, access system identification information, and a degree of compulsion to the UE, wherein the degree of compulsion includes a degree of compulsion that, in a case where the UE has received the mobile operator policy, issues an instruction to switch a communication path used for an APN corresponding to the APN identifier to an access system corresponding to the access system identification information.

* * * * *